US012604813B2

(12) United States Patent
Robison et al.

(10) Patent No.: US 12,604,813 B2
(45) Date of Patent: Apr. 21, 2026

(54) ACCUMULATOR COTTON COMPRESS ASSEMBLY

(71) Applicant: DEERE & COMPANY, Moline, IL (US)

(72) Inventors: Jeremy P. Robison, West Des Moines, IA (US); Jeffrey S. Wigdahl, Ames, IA (US); Steven D. Wallestad, Ankeny, IA (US); Justin E. Hummel, Des Moines, IA (US)

(73) Assignee: Deere & Company, Moline, IL (US)

( * ) Notice: Subject to any disclaimer, the term of this patent is extended or adjusted under 35 U.S.C. 154(b) by 434 days.

(21) Appl. No.: 18/301,351

(22) Filed: Apr. 17, 2023

(65) Prior Publication Data

US 2023/0397540 A1      Dec. 14, 2023

Related U.S. Application Data

(60) Provisional application No. 63/366,329, filed on Jun. 14, 2022.

(51) Int. Cl.
    *A01F 15/07* (2006.01)
    *A01D 46/08* (2006.01)
    *A01F 15/10* (2006.01)
(52) U.S. Cl.
    CPC ........ *A01F 15/0705* (2013.01); *A01D 46/085* (2013.01); *A01F 15/106* (2013.01)
(58) Field of Classification Search
    CPC .......................... A01F 15/0705; A01D 46/084
    See application file for complete search history.

(56) References Cited

U.S. PATENT DOCUMENTS

| | | | |
|---|---|---|---|
| 4,029,228 A | 6/1977 | Shaver | |
| 4,338,770 A | 7/1982 | Schlueter | |
| 4,606,177 A | 8/1986 | Schlueter | |
| 5,533,932 A * | 7/1996 | Covington | A01D 46/084 |
| | | | 56/28 |
| 5,584,762 A | 12/1996 | Buhler et al. | |
| 6,159,094 A | 12/2000 | Deutsch | |
| 2013/0096782 A1* | 4/2013 | Good | A01D 41/1217 |
| | | | 701/50 |
| 2014/0157745 A1 | 6/2014 | Rumohr et al. | |
| 2021/0282318 A1* | 9/2021 | Cracraft | A01F 15/0825 |

FOREIGN PATENT DOCUMENTS

WO      WO 2020068138 A1      4/2020

OTHER PUBLICATIONS

Turkish Search Report issued in application No. 2023/005449 dated May 15, 2023, 10 pages.

* cited by examiner

*Primary Examiner* — Cathleen R Hutchins

(57) ABSTRACT

An accumulator includes an enclosure, an inlet, an outlet, at least one roller, and a cotton compress assembly. The cotton compress assembly includes a first auger coupled to the enclosure. The first auger has a first shaft and a flighting attached to the first shaft. The flighting is positioned within the enclosure. The first auger compresses the cotton when the first auger rotates around a first axis.

20 Claims, 29 Drawing Sheets

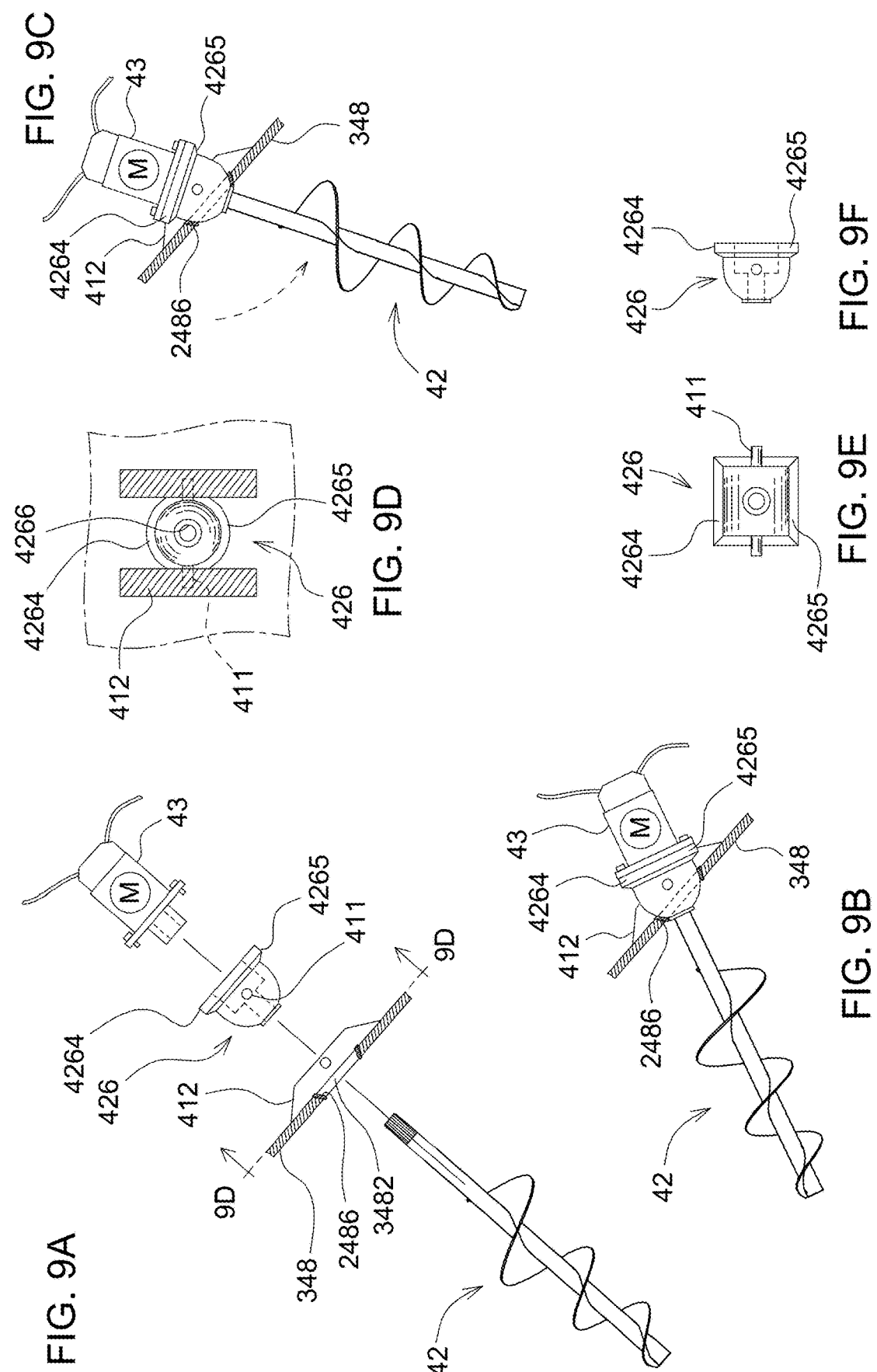

80

4223

3482

4262

4265

4264

4221

422

3484

414

41

412

ACCUMULATOR COTTON COMPRESS ASSEMBLY

RELATED APPLICATIONS

This application claims the benefit of U.S. Provisional Application 63/366,329, titled Accumulator Cotton Compress Assembly, filed Jun. 14, 2022, which is hereby incorporated by reference in its entirety.

FIELD OF THE DISCLOSURE

The present disclosure relates generally to a cotton harvester, especially an accumulator of the cotton harvester.

BACKGROUND OF THE DISCLOSURE

An accumulator plays a key role in enabling non-stop harvest. When the round module reaches full size, it must be wrapped and ejected. During this time, it is not possible to feed cotton into the module builder, so the harvested cotton 'accumulates' in the accumulator.

To maintain non-stop harvest during the wrap and eject cycle, the accumulator must have the capacity to collect all the cotton harvested in this time frame. The amount of cotton the accumulator can hold is a function of its volume and the density of the cotton in that volume.

Since the accumulator is limited in volume by the geometric constraints of the machine, it is the objective of this disclosure to increase the capacity of the accumulator via increasing the density of the cotton, while still maintaining its ability to unload easily without bridging problems.

SUMMARY OF THE DISCLOSURE

According to an aspect of the present disclosure, an accumulator includes an enclosure, an inlet, an outlet, at least one roller, and a cotton compress assembly. The enclosure defines a storage space to store cotton. The inlet receives cotton to the storage space. The outlet is positioned at a bottom of the enclosure and releases the cotton that has been accumulated in the enclosure. At least one roller is positioned adjacent to the outlet and conveys the cotton. The cotton compress assembly includes a first auger coupled to the enclosure, extending from a rear of the enclosure toward a front of the enclosure. The first auger has a first shaft and a flighting attached to the first shaft. The flighting is positioned within the enclosure and the first auger rotates around a first axis.

According to an aspect of the present disclosure, a cotton handling system for a cotton harvester is introduced. The system may comprise an accumulator, an auger, an actuator, and a controller. The accumulator has the enclosure configured to receive cotton from an inlet. The auger is positioned within the enclosure and is configured to compress the cotton when the first auger rotates around an axis. The actuator is coupled to the auger and is configured to pivot the auger. The controller is configured to receive a signal from a sensor associated with the accumulator, to determine, based on the received signal, whether a bridge of cotton is formed within the accumulator, and to command, in response to determining the bridge, the actuator to pivot the auger.

According to an aspect of the present disclosure, a cotton harvester includes a harvesting structure, an accumulator, a duct system, and a module builder. The harvesting structure removes cotton from a field. The accumulator has an enclosure, an inlet, an outlet, and a cotton compress assembly. The enclosure defines a storage space to store the cotton. The inlet receives cotton to the storage space. The outlet is positioned at a bottom of the enclosure and releases the cotton that has been accumulated in the enclosure. The cotton compress assembly includes a first auger coupled to the enclosure, extending from a rear of the enclosure toward a front of the enclosure. The first auger has a first shaft and a flighting attached to the first shaft. The first auger is positioned within the enclosure and compresses the cotton when the first auger rotates around a first axis. The cotton moves from the harvesting structure to the accumulator through the duct system. The module builder is coupled to the accumulator and receives the cotton from the accumulator.

Other features and aspects will become apparent by consideration of the detailed description and accompanying drawings.

BRIEF DESCRIPTION OF THE DRAWINGS

The detailed description of the drawings refers to the accompanying figures in which:

FIG. 8B-1 is a diagram showing the motors in another series arrangement.

FIG. 8B-2 is a diagram showing the motors in another series arrangement.

FIG. 9A is an exploded view of a support structure configured to be partially inserted into an aperture of an enclosure of the accumulator.

FIG. 9B illustrates the support structure in FIG. 9A pivoting up relative to the enclosure.

FIG. 9C illustrates the support structure in FIG. 9A pivoting down relative to the enclosure.

FIG. 9D includes a cross-sectional view, along the section line 9D-9D, of a pivot unit and a front view of the support structure in FIG. 9A.

FIG. 9E is a front view of a support structure different from that in FIG. 9A.

FIG. 9F is a side view of the support structure in FIG. 9E.

DETAILED DESCRIPTION OF THE DISCLOSURE

Figure 1:
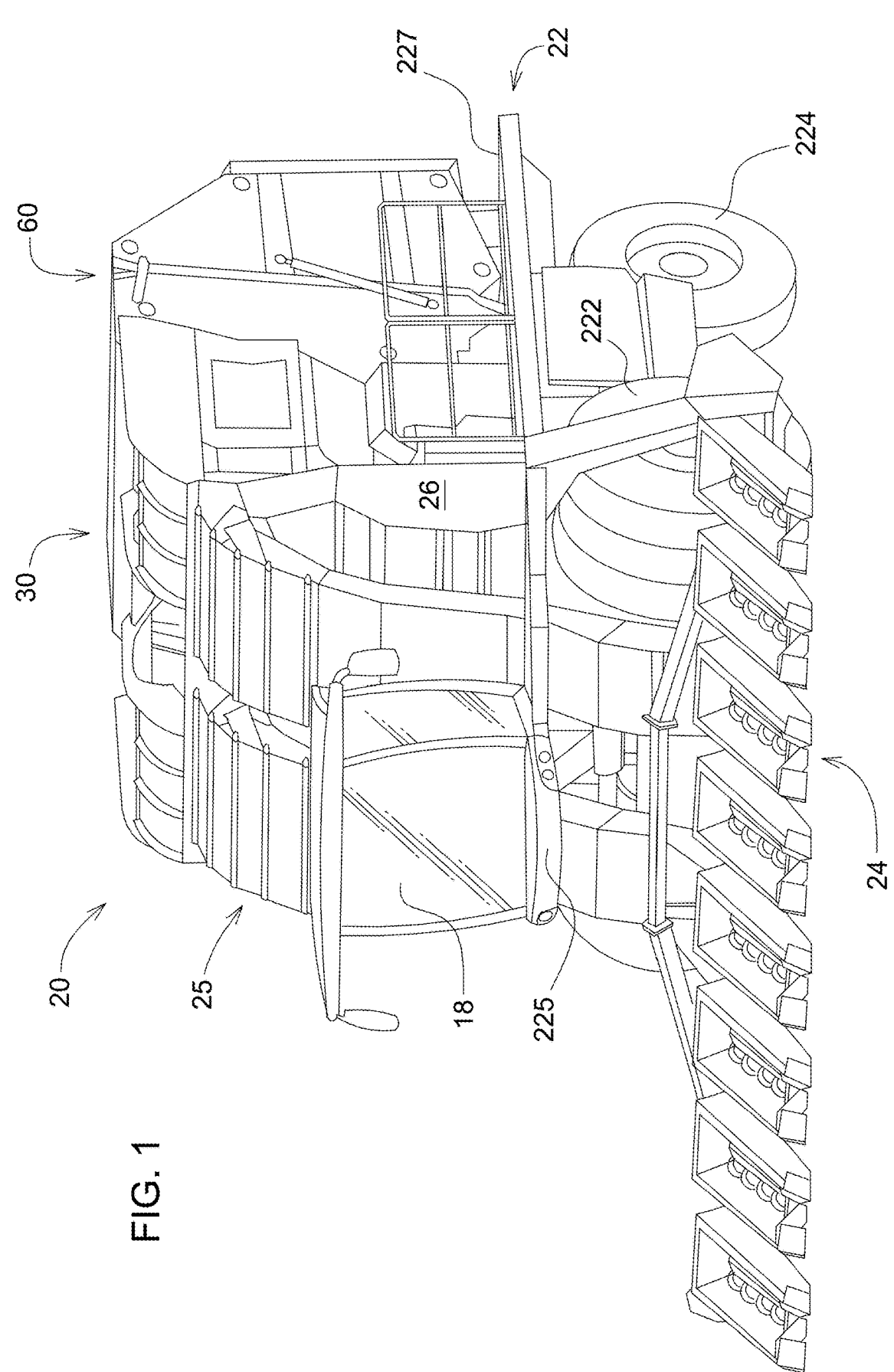
FIG. 1 is a schematic perspective view of a cotton stripper.
Figure 2:
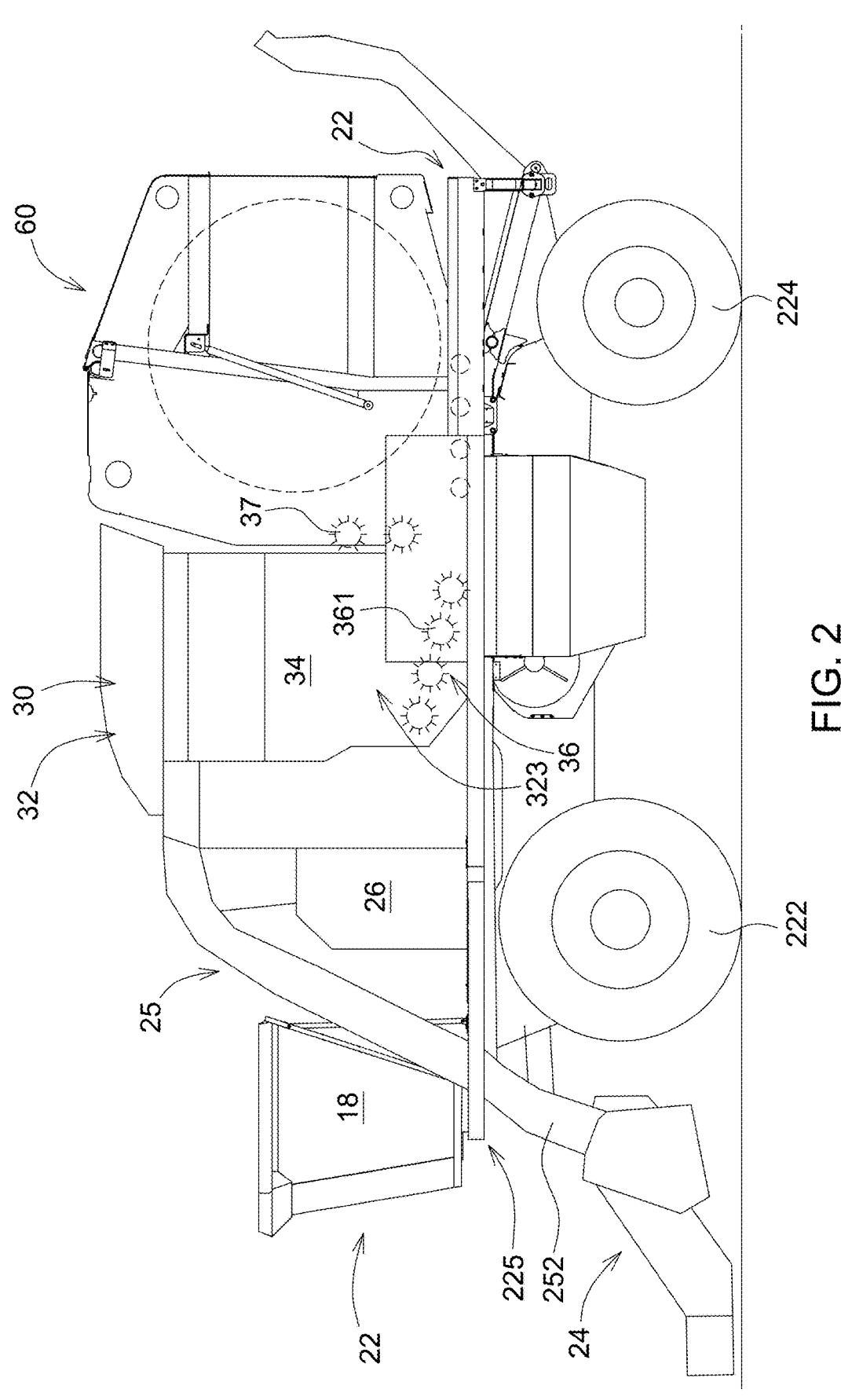
FIG. 2 is a schematic side view of the cotton stripper.
Figure 3:
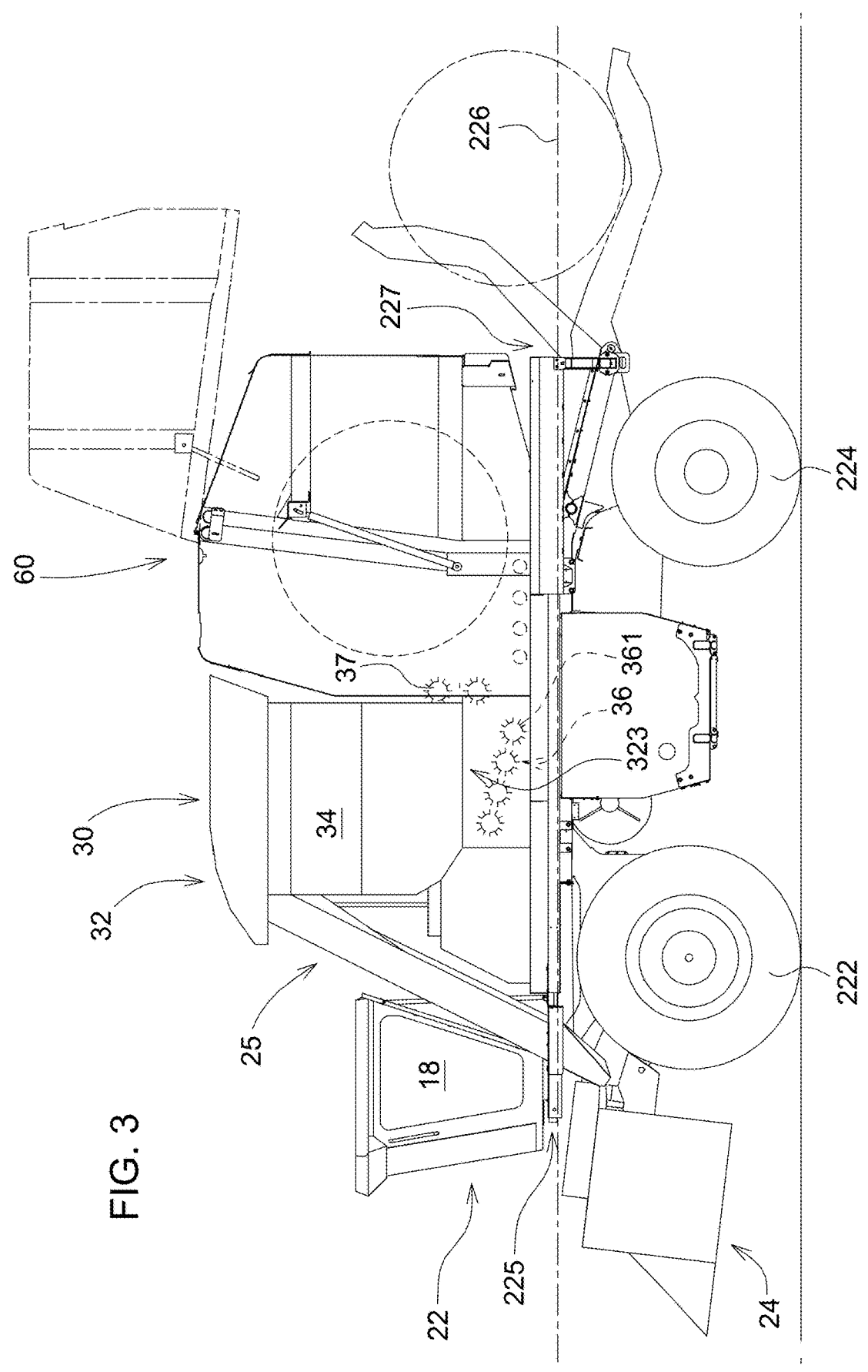
FIG. 3 is a schematic side view of the cotton picker.

Referring to FIGS. 1, 2, and 3, a cotton harvester 20 may be a cotton stripper (FIGS. 1 and 2) or a cotton picker (FIG. 3). The cotton harvester 20 includes a main frame 22 supported by front wheels 222 and rear wheels 224. The main frame 22 extends along a central longitudinal axis 226 between a forward end 225 and a rearward end 227 relative to a direction of travel. The cotton harvester 20 also includes a cab 18 and a harvesting structure 24. The cab 18 is supported at the forward portion of the main frame 22 above the harvesting structure 24, which removes cotton from plants and directs the removed cotton into a cleaner 26 (FIGS. 1 and 2) or directly to a storing system 30 (FIG. 3) through a duct system 25.

The harvesting structure 24 is configured to remove cotton from the field. In one implementation, the cotton harvester 20 is a cotton stripper, as shown in FIGS. 1 and 2, and the harvesting structure 24 is a stripper row unit as described in commonly assigned U.S. Pat. No. 4,338,770, which is hereby incorporated by reference in its entirety. Alternatively, in another implementation, the cotton harvester 20 is a cotton picker, as shown in FIG. 3, the harvesting structure 24 may be a picker row unit.

Referring to FIGS. 1 and 2, the duct system 25 may be in communication with the harvesting structure 24. The duct system 25 has a first duct 252 configured for receiving cotton from the harvesting structure 24. This implementation describes the cotton harvester 20 as a cotton stripper, and therefore the cotton harvester 20 may have a cleaner 26 in communication with the first duct 252 of the duct system 25. The cleaner 26 is configured for receiving cotton from the first duct 252 of the duct system 25 and removing trash from the cotton. The cleaner 26 is of the type described in commonly assigned U.S. Pat. Nos. 4,606,177 and 6,159,094, which are hereby incorporated by reference in their entirety. The duct system 25 also has a second duct (not shown) configured for receiving cotton that has been cleaned from the cleaner 26. The cotton is later received by the storing system 30. In another implementation, with reference to FIG. 3, when the cotton harvester 20 is a cotton picker, the removed cotton from the picker row unit may be directly received by the storing system 30 through the duct system 25 without the cleaner 26. The storing system 30 described below can be used in the cotton stripper or the cotton picker.

Figure 4A:
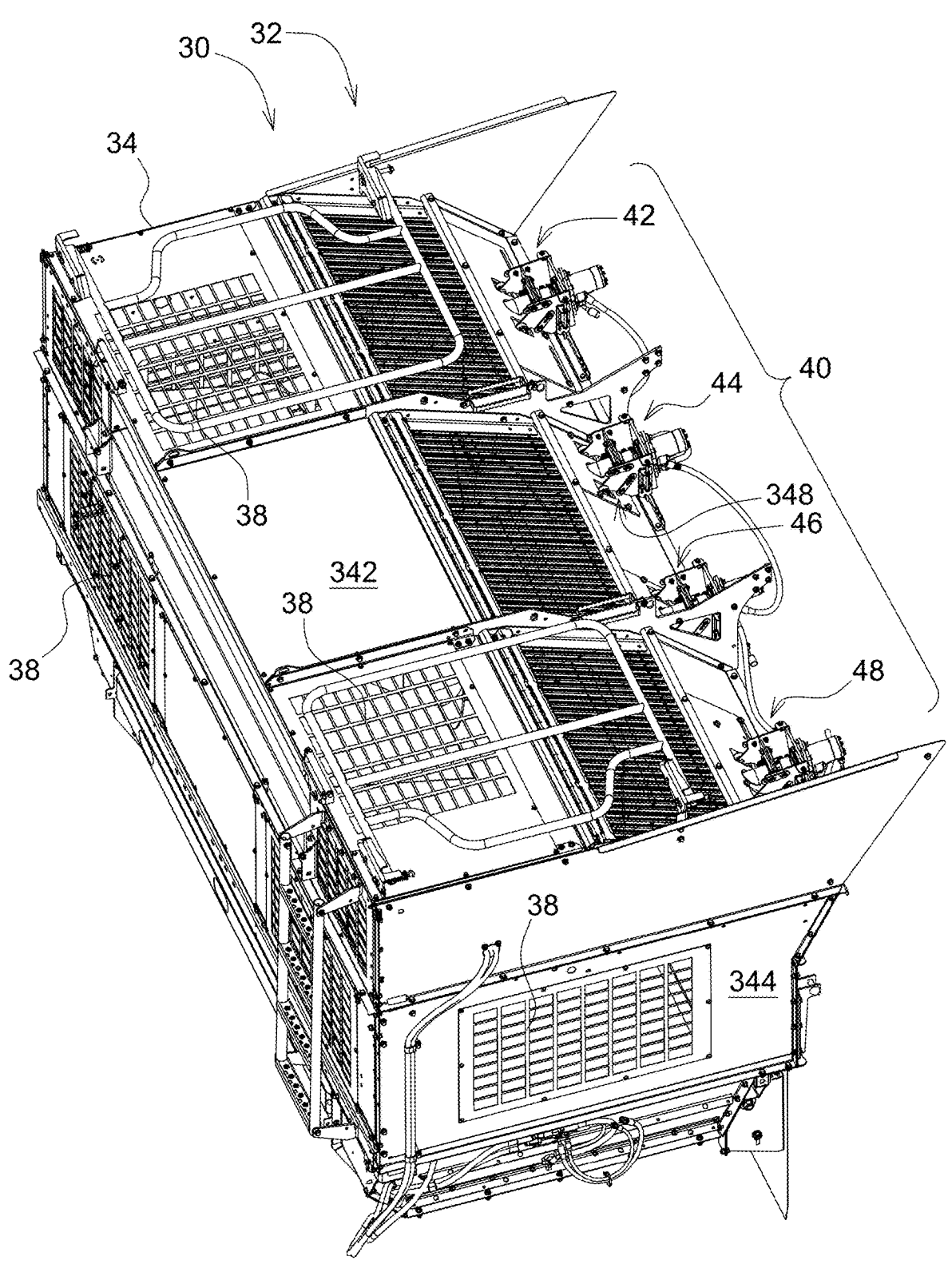
FIG. 4A is a perspective view of an accumulator.
Figure 4B:
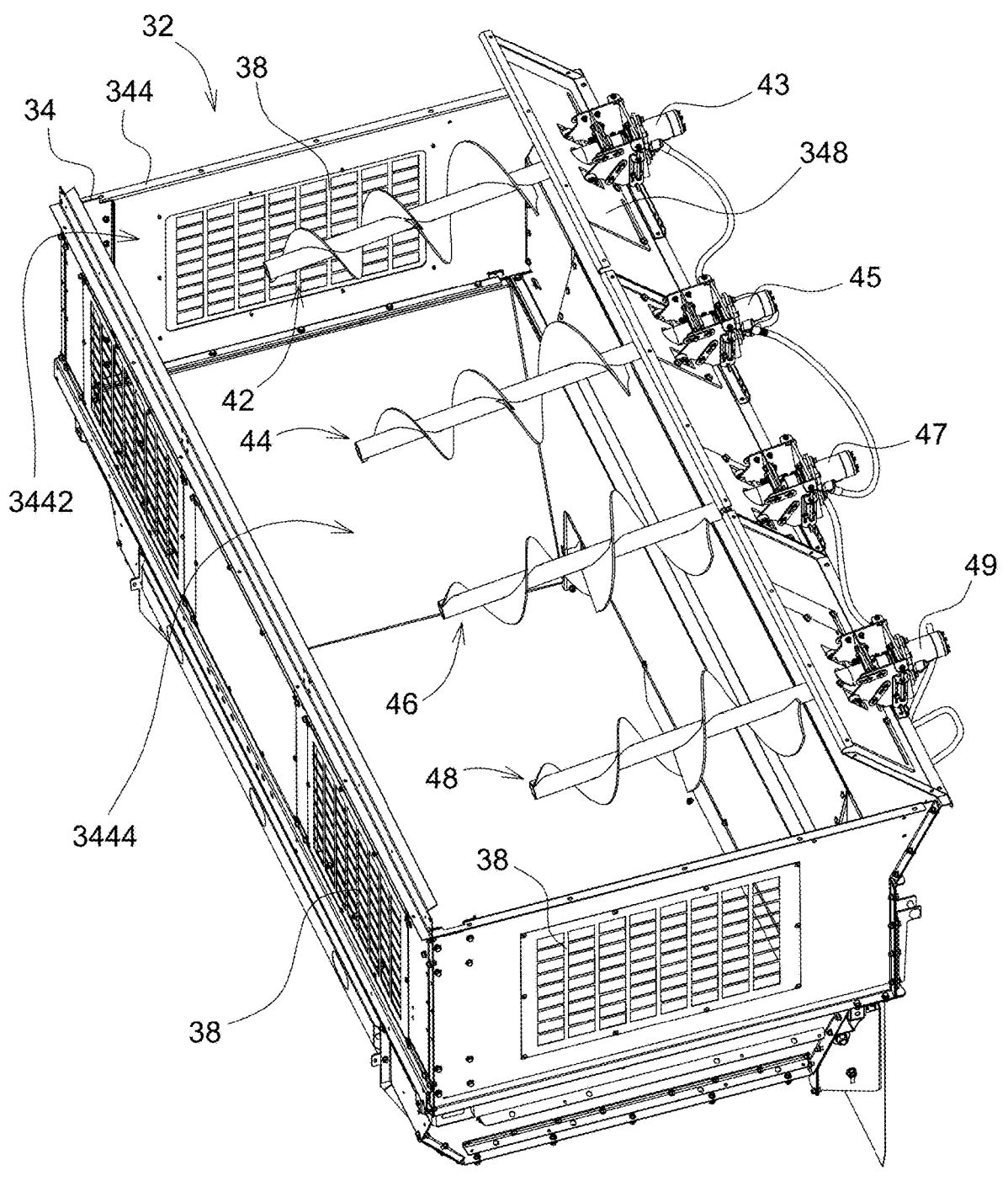
FIG. 4B is a perspective view of an accumulator without an upper paneled section to illustrate a cotton compress assembly having four augers.
Figure 5:
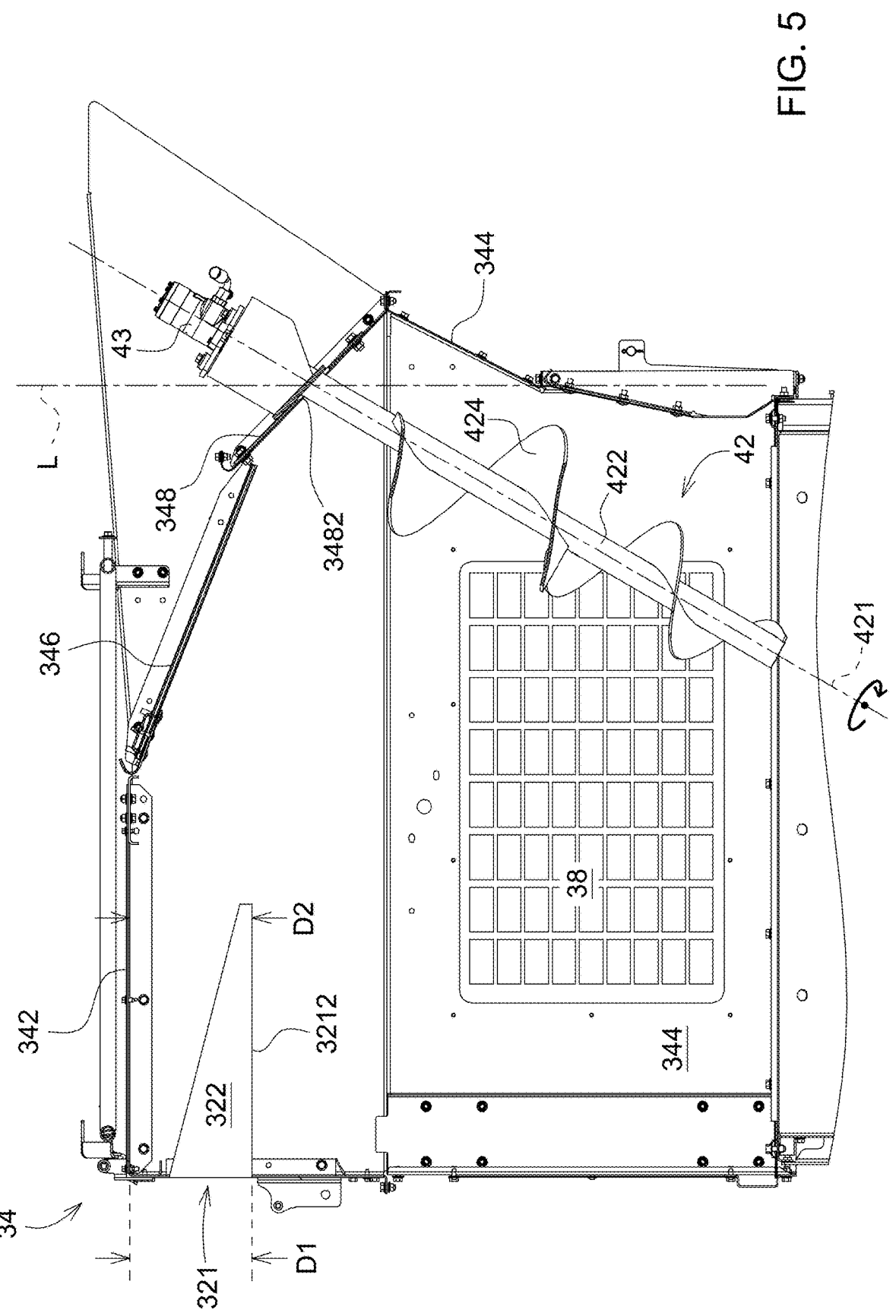
FIG. 5 is a side view of an auger in one implementation that is fixed to the enclosure of the accumulator.

Referring to FIGS. 2, 3, 4A and 4B, the storing system 30 includes an accumulator 32 with upright storage space defined by an enclosure 34 of the accumulator 32 and a module builder 60 coupled to the accumulator 32. The accumulator 32 receives the cotton through an inlet 321. The cotton from the inlet 321 is guided by a shelf 322 (as shown in FIGS. 5-6C) and blown to the back of the accumulator 32. The number of the inlet(s) 321 and the number of the shelf 322 herein are explanatory. In another implementation (not shown), there are multiple inlets 321 with respective shelves 322 guiding the cotton from the inlets 321. In another implementation, there are multiple inlets 321 with a single shelf 322 guiding the cotton from the inlets 321. In respect to the length of the shelf 322, the shelf 322 extends rearwardly. When an auger (e.g., an auger 42), extending from the rear toward the front of the enclosure 34, is pivoted upward to a certain extent, the shelf 322 and the auger 42 may overlap in the fore-and-aft direction, as shown in FIG. 6B. The angle between a bottom plate 3212 and the front of the enclosure 34 may vary. In one implementation, the bottom plate 3212 may be parallel to an upper paneled section 342 of the enclosure. As shown in FIG. 5, a distance D1 between the front of the bottom plate 3212 and the upper paneled section 342 is equal to a distance D2 between the rear end of the bottom plate 3212 and the upper paneled section 342. In another implementation, the bottom plate 3212 may extend downward from the front toward the rear of the enclosure 34. In other words, the distance D1 between the front of the bottom plate 3212 and the upper paneled section 342 is smaller than the distance D2 between the rear end of the bottom plate 3212 and the upper paneled section 342 (not shown). The accumulator 32 stores and accumulates cotton to improve the efficiency of the operation. For example, when the module builder 60 is forming or wrapping a module, the cotton harvester 20 can still travel to remove the cotton and build up the cotton in the accumulator 32 to save time before the module builder 60 is ready to receive the cotton. In another example, when the cotton harvester 20 operates in the field in a low yield cotton condition, the accumulator 32 may reduce the module builder's 60 running cycle to reduce module builder 60 wear and power consumption compared to a system which has to run continuously. The module builder 60 may only need to build the module when the accumulator 32 unloads appropriate amount of cotton through an outlet 323 of the accumulator 32.

The enclosure 34 of the accumulator 32 includes the upper paneled section 342 and a side paneled section 344. The upper paneled section 342 may include one or more panels coupled together and parallel to the ground. The side paneled section 344 may form an upper portion defining a rectangular storage space 3442 and a lower portion defining a tapered storage space 3444 which tapers inwardly in the downward direction (as shown in FIG. 4B) to a connection with a metering floor 36 (as shown in FIGS. 2 and 3) which closes the bottom of the enclosure 34 having the outlet 323 configured to release the cotton that has been accumulated in the enclosure 34. The storing system 30 may include multiple rollers, some of which are metering rollers 361 forming the metering floor 36 (as shown in FIGS. 2 and 3) and some of which are beating rollers 37 adjacent to the outlet 323. The metering floor 36 and beating rollers 37 uniformly distribute the cotton to the module builder 60 which first forms a compressed mat of material and then rolls the mat into a compact bale or module.

The enclosure 34 may include multiple screens 38 located on the upper paneled section 342 and the side paneled section 344. The screens 38 allow air and debris to separate from the cotton and exit the accumulator 32.

The enclosure 34 may also include a base plate(s) 348 positioned on upper and/or rear portion of the enclosure 34. The accumulator 32 includes a cotton compress assembly 40 having at least one auger. As shown in FIGS. 4A and 4B, the cotton compress assembly 40 includes the first, second, third and fourth augers 42, 44, 46, and 48. The number of the augers disclosed herein in is for demonstrative purpose, and it could be one or more than one auger. As shown in FIG. 4B, the first and second augers 42, 44 include right hand flightings; the third and fourth augers 46, 48 include left hand flightings. The augers 42, 44 and the augers 46, 48 rotate in opposite directions in this implementation (also shown in FIG. 8A). The first, second, third and fourth augers 42, 44, 46, and 48 may be coupled to a respective base plate 348 of the enclosure 34, as shown in FIGS. 4A and 4B. In another implementation, the number of the base plate 348 is one and it extends laterally for the installation of the first, second, third and fourth augers 42, 44, 46, and 48 (not shown).

Because of the similarity of the first, second, third and fourth augers 42, 44, 46, and 48, FIGS. 5, 6A-6E, and 7A-7B only demonstrate the first auger 42 for clarification.

Referring to FIG. 5, the first auger 42 may be coupled to the upper and rear portions of the enclosure 34. A transitional section 346 is coupled to or a part of the upper paneled section 342. The base plate 348 is coupled between the transitional section 346 and the side paneled section 344. The first auger 42 includes a first shaft 422 and a flighting 424 attached to the first shaft 422. The base plate 348 of the enclosure 34 includes an aperture 3482 which the first shaft 422 passes through. The aperture 3482 in FIG. 5 is a circular hole but in another implementation can be different shape. The flighting 424 is positioned within the enclosure 34 and is configured to compress (compact) the cotton when the first auger 42 rotates around a first axis 421. The first auger 42 compresses the cotton, increases the density of the cotton, and therefore increases the capacity of the accumulator 32. The first axis 421 of the first shaft 422 is stationary such that an angle between the first shaft 422 and the enclosure 34 remains the same. A line L in FIG. 5 represents an orientation of the enclosure 34. The angle herein is between the first shaft 422 and the line L. In this implementation, the first auger 42 extends forward relative to the direction of travel and downward. In another implementation, the first auger 42 may be coupled to the upper and front portions of the enclosure 34 and extends rearward relative to the direction of travel and downward (not shown). The flighting 424 can be a tapered flighting or constant flighting. A first motor 43 is coupled to the first shaft 422, providing rotational output to rotate the first auger 42 around the first axis 421.

Figure 4C:
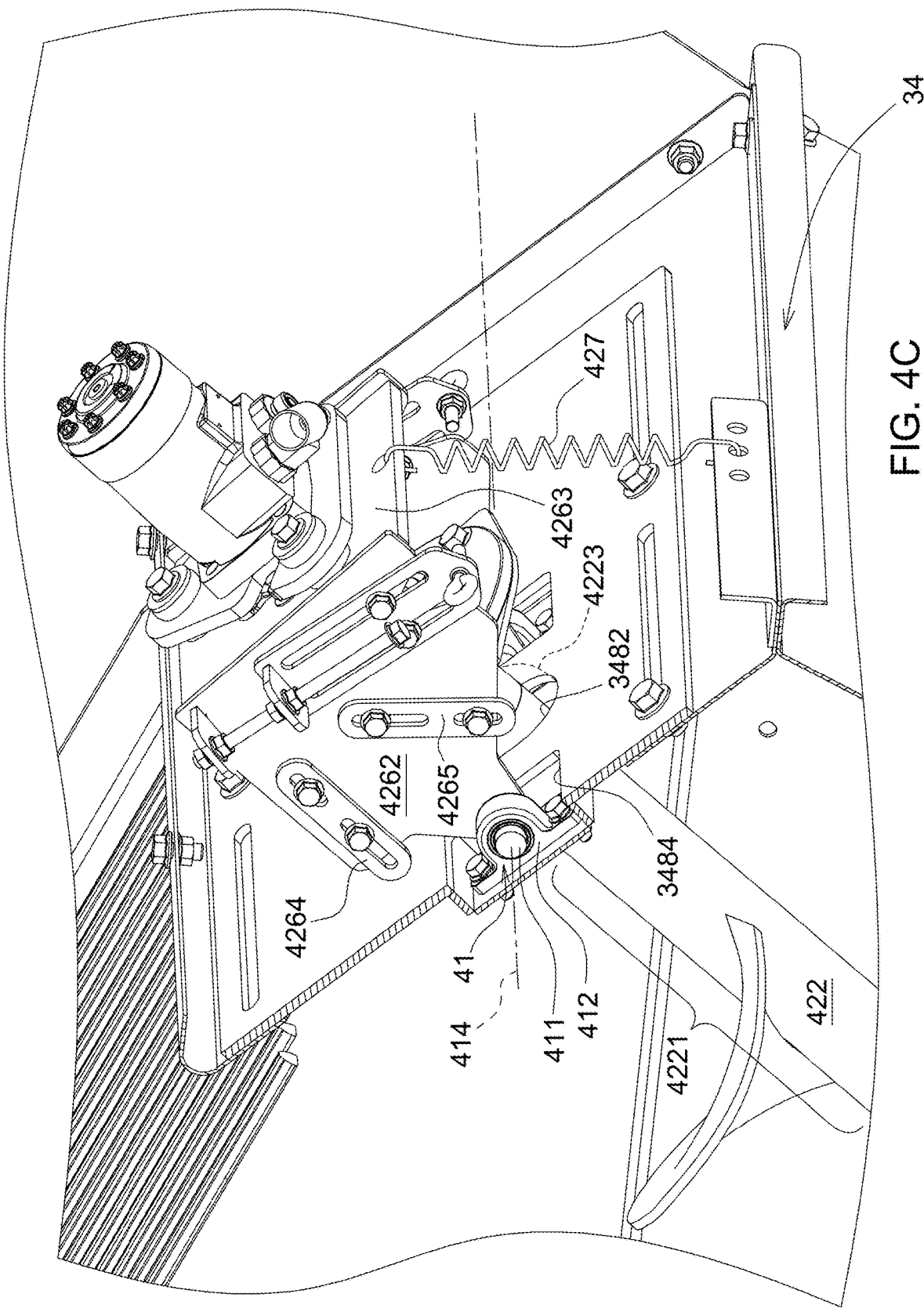
FIG. 4C is an enlarged perspective view of the accumulator in FIG. 4A having a resilient member coupled between an enclosure and a support structure.

Referring to FIGS. 4C, 6A-6C, similar to the implementation shown in FIG. 5, the first auger 42 may be coupled to the upper and rear portions of the enclosure 34, which is the base plate 348. The flighting 424 can be a tapered flighting or constant flighting. The first auger 42 includes the first shaft 422 and the flighting 424 attached to the first shaft 422. The base plate 348 of the enclosure 34 includes an aperture 3482 which the first shaft 422 passes through. The flighting 424 is positioned within the enclosure 34 and is configured to compress the cotton when the first auger 42 rotates around a first axis 421. When the first auger 42 rotates around a first axis 421, a force F from the flighting 424 of the first auger 42 is created and applied to the cotton. The force F includes a forward horizontal force FH and downward vertical force FN. However, in this implementation, the first auger 42 is configured to pivot up and down relative to the enclosure 34. The cotton compress assembly 40 includes pivot unit 41 coupling the first auger 42 to the enclosure 34, such that the first auger 42 is pivotable. The aperture 3482 in this implementation is an elongate through hole (as shown in FIG. 4C) so as to permit the first shaft 422 of the first auger 42 to pivot in a certain degree. Alternative or concurrently, a mechanical stop(s) may be applied to the first auger 42 to limit the first auger 42 to pivot within a defined range, which is described later.

Figure 6A:
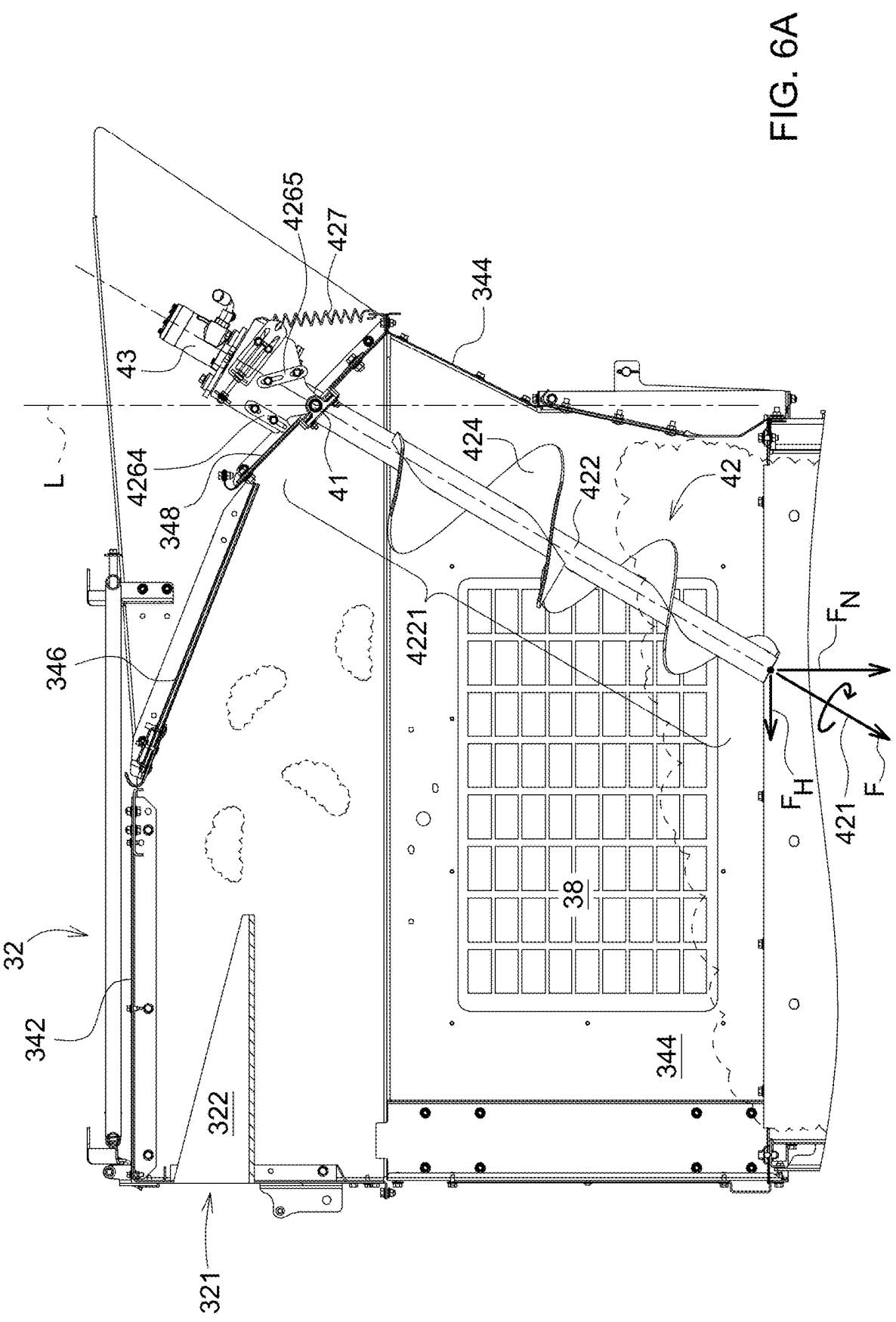
FIG. 6A is a side view of an auger in one implementation that is located at a first position in the enclosure of the accumulator.
Figure 6B:
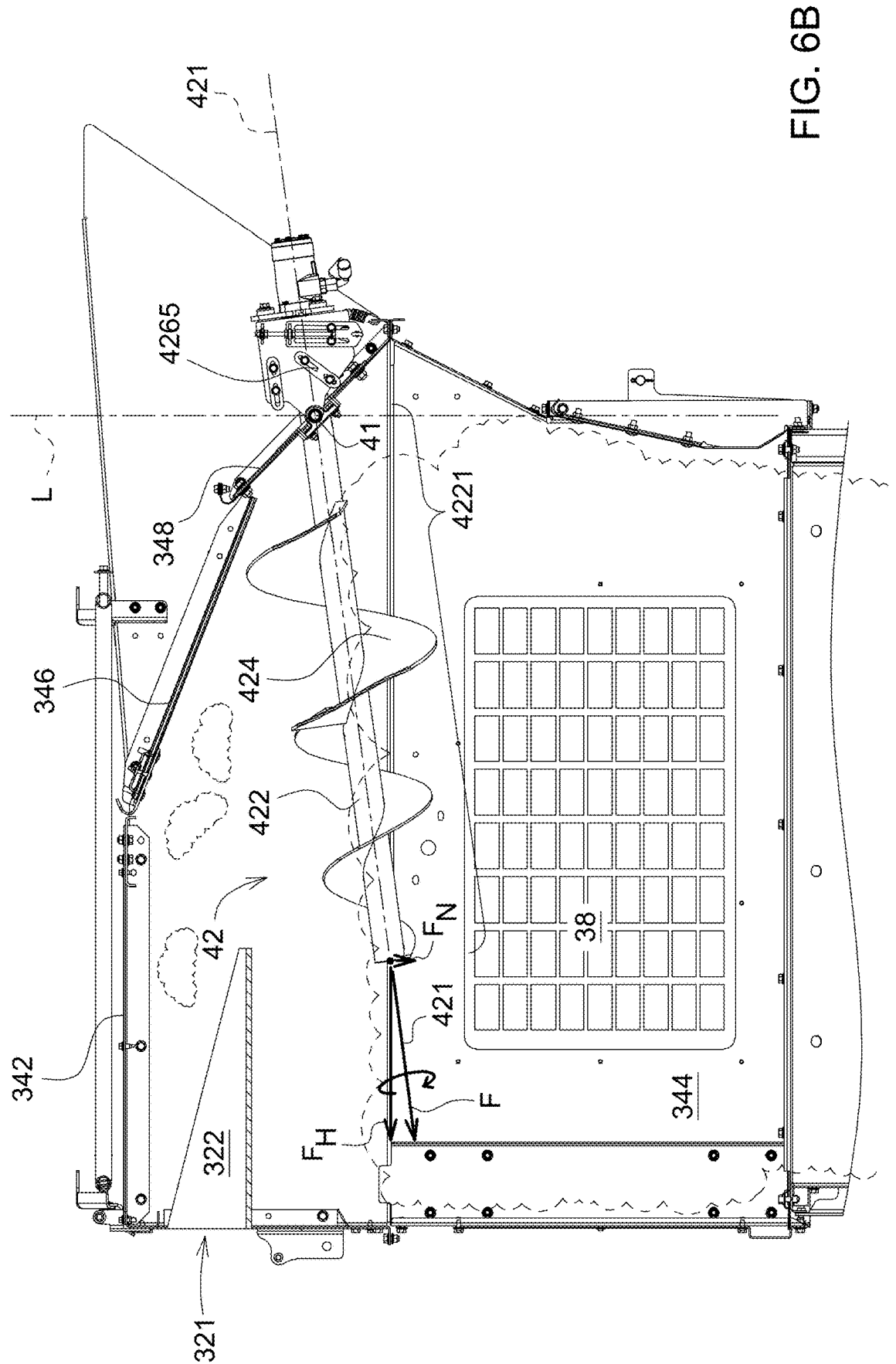
FIG. 6B is a side view of the auger in FIG. 6A that is pivoted to a second position in the enclosure of the accumulator.
Figure 6C:
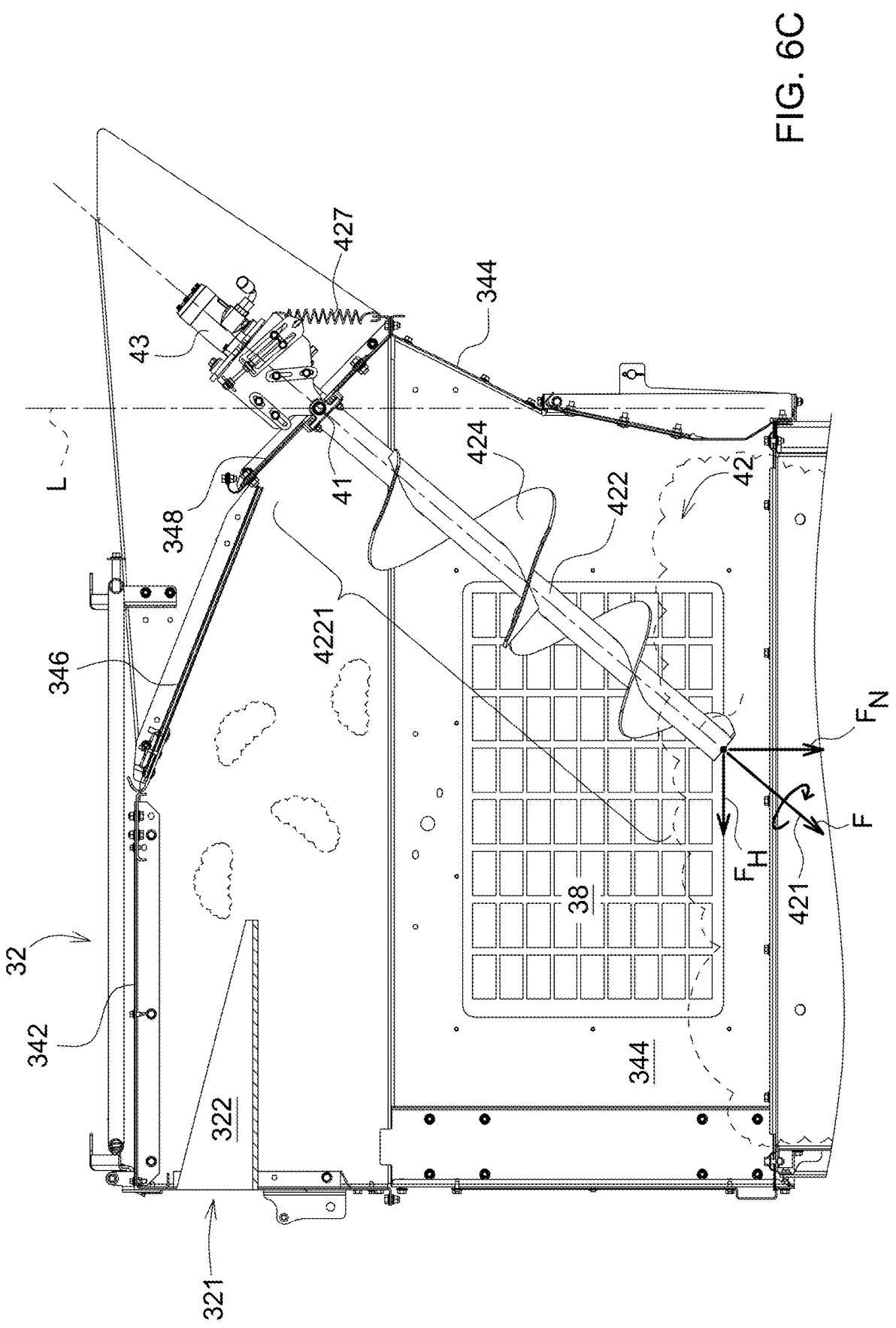
FIG. 6C is a side view of the auger in FIG. 6A that is pivoted to a position between the first and second positions in the enclosure of the accumulator.

Because the first auger 42 disclosed in FIGS. 6A-6C is pivotable, the direction of the force F is changeable. The angle between the first shaft 422 and the line L increases when the first auger 42 pivots from a first position (shown in FIG. 6A) to a second position (shown in FIG. 6B). FIG. 6C illustrates a position between the first and second position. From the first position to the second position, the forward horizontal force FH increases and the downward vertical force FN decreases.

Figure 6D:
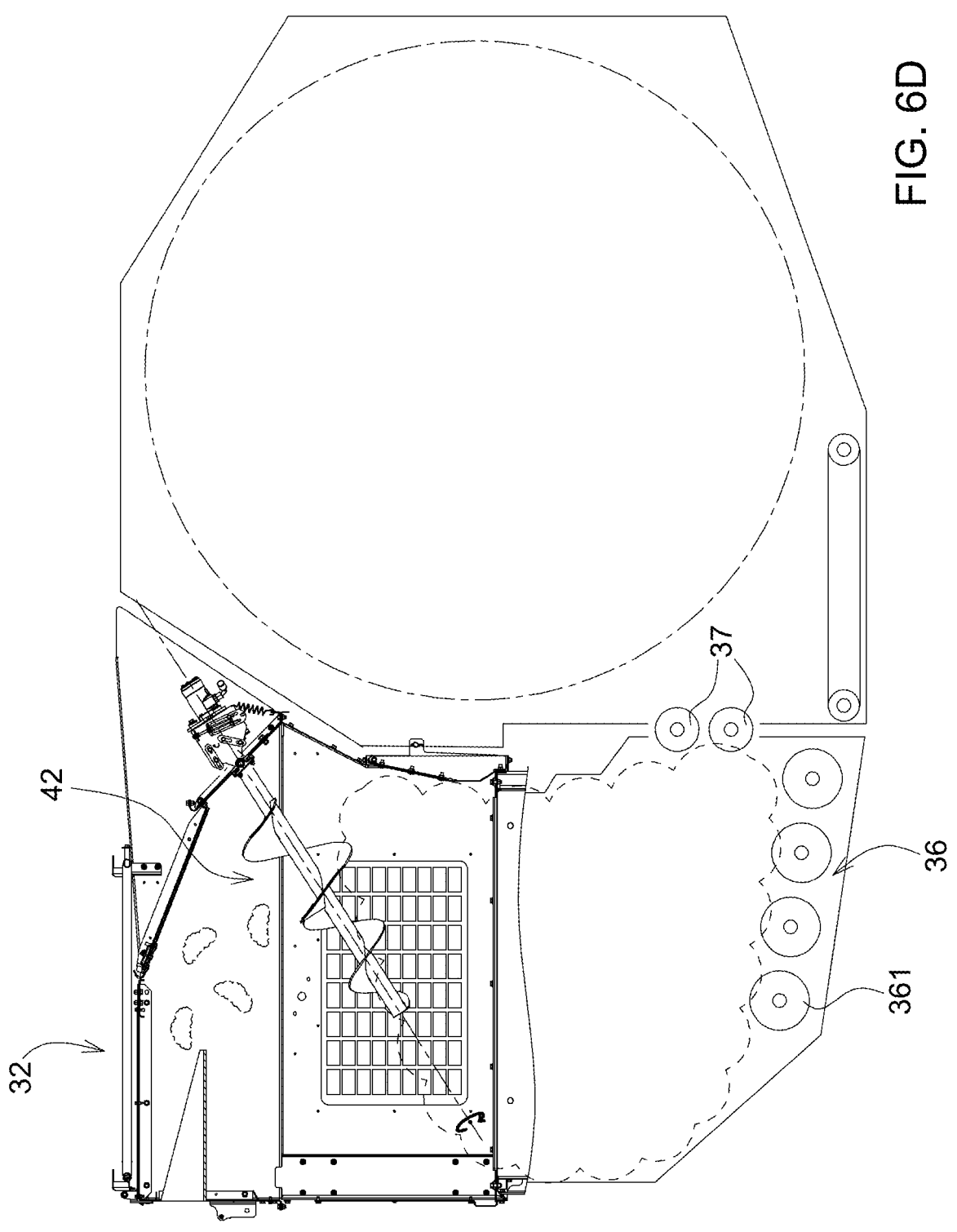
FIG. 6D is a side view of the accumulator with the auger.
Figure 6E:
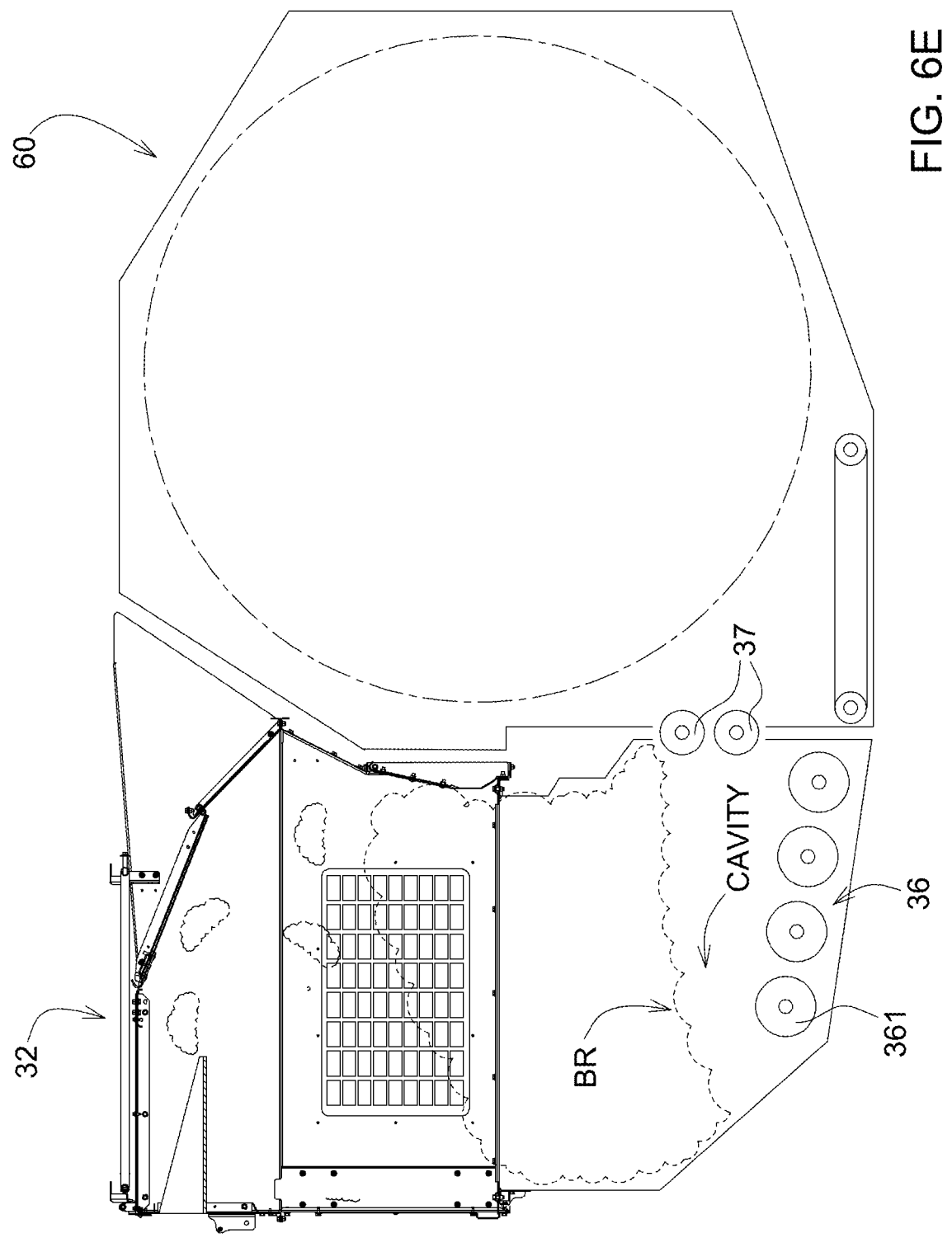
FIG. 6E is a side view of the accumulator without the auger.

The accumulated cotton may need to be allocated in a proper manner and the density of the cotton needs to be within an appropriate range, so as to unload the accumulated cotton to the module builder 60 smoothly, as shown in FIG. 6D. Referring to FIG. 6E, when there is no auger installed in the accumulated cotton in the accumulator 32, a bridge BR may be formed in the tapered storage space 3444 of the accumulator 32, and the cotton is accumulated more in the back of the accumulator 32 than in the front of the accumulator 32. A cavity formed underneath the bridge BR separate the cotton from the metering roller 361 and/or the beating rollers 37, such that the cotton cannot be feed to the module builder 60. However, when the accumulator 32 includes the first auger 42 as shown in FIGS. 6A-6D, the first auger 42 facilitates the distribution of the cotton and control the density of the cotton. As shown in FIG. 6A, the downward vertical force FN exerted on the cotton to ensure cotton is packed in an appropriate density, without the bridge BR. When the first auger 42 rotates around the first axis 421 and a level of the cotton accumulated within the enclosure 34 rises, the reaction of the downward vertical force FN from the cotton to the flighting 424 pivots the first auger 42 upward to increase the angle between the first shaft 422 and the line L relative to the enclosure 34, so as to decrease the downward vertical force FN from the flighting 424 to compress the cotton. With the cotton accumulated, as shown in FIGS. 6B, the weight of the cotton causes the bottom of the cotton compressed and therefore decreasing the downward vertical force FN can avoid plugging resulting from overpacked cotton during unloading. In addition, the forward horizontal force FH increasing during the first auger 42 pivoting from the first position to the second position will move more cotton from the back to the front of the accumulator 32. Further, the center of the mass moves forward while the first auger pivots up to decrease the pressure on the cotton in the back of the accumulator 42. As such, the density of the cotton in the front of the accumulator that was loose will increase; the density of the cotton in the back of the accumulator that was tight will decrease. The use of the storage space (rectangular storage space 3442 and tapered storage space 3444) is optimized. The capacity of the accumulator 32 is therefore increased.

As to the structure of the first auger 42, referring to FIGS. 6A-6C, the first shaft 422 includes a first section 4221 attached by the flighting 424 and a second section 4223 positioned outside of the enclosure 34 and coupled to the first motor 43. The pivot unit 41 is positioned between the first section 4221 and the second section 4223, such that the weight of the motor 43 and the weight of the first section 4221 with flighting 424 pivot the first auger 42 around the pivot unit 41 in opposite directions. The second section 4223 of the first shaft 422 is coupled to a support structure 426. The support structure 426 may carry the weight of the first motor 43 and the weight of the components of the first auger 42 such as first shaft 422 and first flighting 424 and may transfer the weight to the enclosure 34 via the pivot unit 41. In this implementation, the support structure 426 may have two side plates 4262 pivotably coupled to the pivot unit 41. The second section 4223 is positioned between the side plates 4262. At least one of the side plates 4262 includes two stops 4264, 4265 spaced apart from one another and extending toward the enclosure 34 of the accumulator 32. The stops 4264, 4265 are configured to engage the enclosure 34 to limit a pivotal movement of the first shaft 422. For example, as shown in FIG. 6A, when there is no or only little amount of the cotton, the weight of the first section 4221 pivots the first auger 42 counterclockwise, and the stop 4264 prevents the first auger 42 from pivoting downward. As such, the flighting 424 of the first auger 42 will not hit the side paneled section 344 of the enclosure 34.

As shown in FIG. 6B, the cotton keeps accumulating in the accumulator 32. When the first auger 42 rotates around the first axis 421, the reaction of the force F from the cotton to the flighting 424 and the weight of the first section 4221 with the flighting 424 pivot the first auger 42 around the pivot unit 41 in opposite directions. When the reaction from the accumulating cotton keeps pivoting the first auger 42 clockwise (upward), the stop 4265 prevents the first auger 42 from pivoting upward. As such, the flighting 424 of the first auger 42 will not hit the upper paneled section 342 and transitional section 346 of the enclosure 34. Referring to FIG. 6C, the first auger 42, pivoted by the reaction of downward vertical force FN from the cotton when the first auger 42 rotates around the first axis 421, is moved to a position between the first position and the second position. The flighting 424 on the first auger 42 also helps press the surface of the cotton when the first auger rotates. The flighting 424 may be positioned on the top of the cotton and when the first auger 42 rotates around the first axis 421, the flighting 424 rotates and pushes the cotton forward and away from the flighting 424.

With reference to FIG. 4C, the pivot unit 41 includes two pillow block bearings 412 forming a pivot axis 414 passing through the centers thereof. The pivot unit 41 also includes two pins 411 (e.g., trunnions), each of which extends from the bottom of side plates 4262 toward the respective pillow block bearings 412. The pillow block bearings 412, to which the pins 411 are pivotably connected, are positioned outside of the enclosure 34 for the first auger 42 to pivot about the pivot axis 414. The base plate 348 of the enclosure 34 may include two recesses 3484 corresponding to the two pillow block bearings 412. The pillow block bearings 412 are respectively positioned at one recess 3484 of the enclosure 34. Each recess 3484 is recessed inwardly from a portion of the enclosure 34 (here, the base plate 348), such that the pivot axis 414 and the portion of the enclosure 34 are positioned on the same plane. It is noted that, in some other implementations, the pivot units 41 includes stands (not shown) coupling to the base plate 348 and having holes to pivotally receive the pins 411, so as to replace the pillow block bearings 412.

Optionally, at least one resilient member 427, such as a spring, may be applied to the support structure 426 and the enclosure 34. A middle plate 4263 of the support structure, connected between the side plates 4262 engages with one end of the resilient member 427, and the other end of the resilient remember 427 engages with the enclosure 34. The resilient member 427 may be used to balance pivotal movement of the first auger 42. The resilient member 427 provides spring force to assist the first auger 42 pivot clockwise (upward). In another implementation, the operator may apply the resilient member 427 to another part of the support structure 426 and/or another part of the enclosure 34 to assist the first auger pivot counterclockwise (not shown).

The storing system 30 may include one or more clutches, which determine a threshold of the compaction rate. If the auger(s) over pack the cotton in the accumulator 32, the compaction rate will be too high, and the cotton is too compact. As such it may get stuck and not be fed into the module builder 60. A clutch 50 described below may be applied to a stationary auger (implementation shown in FIG. 5) or pivotable auger (implementation shown in FIGS. 6A-6C).

Figures 7A, 7B:
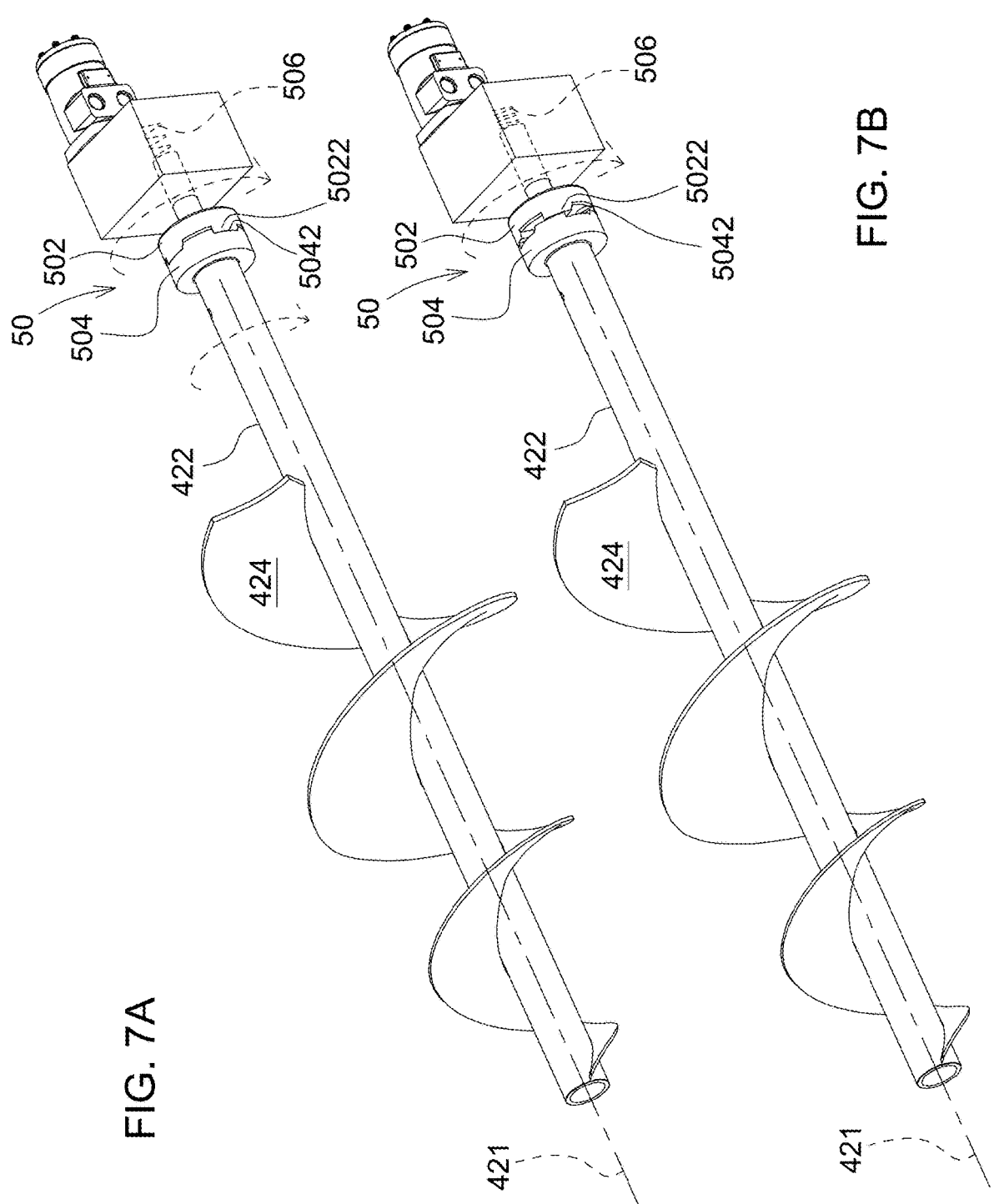
FIG. 7A is a perspective view of a clutch in which the auger and the motor are coupled.
FIG. 7B is a perspective view of the clutch in which the auger and the motor are decoupled.

Referring to FIG. 7A, the clutch 50, such as a finger clutch, is coupled between the first shaft 422 and the first motor 43. The clutch 50 includes a motor clutch portion 502 coupled to the first motor 43 and a shaft clutch portion 504 coupled to the first shaft 422. The motor clutch portion 502 and the shaft clutch portion 504 interlocks one another with fingers 5022, 5042. The clutch 50 is engaged with a spring 506 configured to provide a spring force pushing the motor clutch portion 502 portion or the shaft clutch portion 504 toward one another. In this implementation, when at least a portion of reaction from the cotton applied to the first auger 42 axially along the first shaft 422, the reaction pushes or compress the spring 506 inward. Further, when the portion of reaction exceeds a pre-determined force (threshold), the clutch 50 is moved to disconnect the first shaft 422 and the first motor 43, as shown in FIG. 7B. The fingers 5022 of the motor clutch portion 502 and the fingers 5042 of the shaft clutch portion 504 do not interlock. The first motor 43 may continue spinning when the first shaft 422 of the first auger 42 and the first motor 43 are disconnected.

The number of the augers herein is only for explanatory purpose. Referring to FIGS. 4, the structure of the second, third and fourth augers 44, 46, and 48 may be similar to the first auger 42. For example, the second auger 44 is coupled to the enclosure 34. The second auger 44 includes a second shaft 442 and a second flighting 444 attached to the second shaft 442, positioned within the enclosure 34, and configured to compress the cotton when the second auger 44 rotates around a second axis 441. A second motor 45 is coupled to the second shaft 442 and providing rotational output to rotate the second auger 44 around the second axis 441. The first auger 42 and the second auger 44 may rotate in the same or opposite directions. If the first auger 42 and the second auger 44 rotate around the first axis 421 and second axis 441 in opposite directions, one of the first auger 42 and second auger 44 is right-handed flighting and the other is left-handed flighting, such that both augers 42 and 44 can press the cotton downward. The second, third and fourth augers 44, 46, and 48 in this implementation, like the first auger 42, are configured to pivot up and down relative to the enclosure 34. The first, second, third and fourth augers 42, 44, 46, and 48 may be positioned parallel to each other when they are not pivoted by the cotton.

Figure 8A:
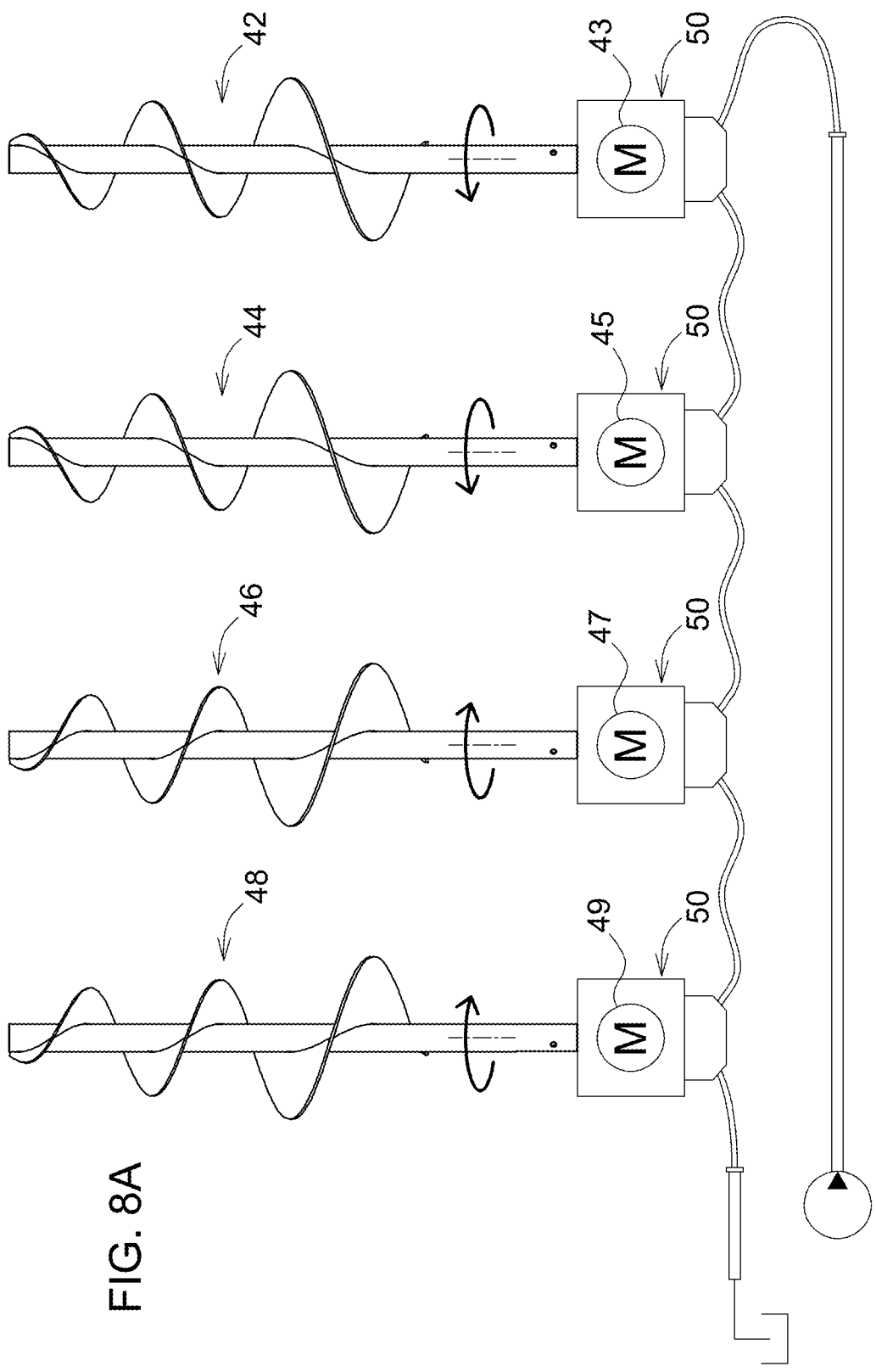
FIG. 8A is a diagram showing the motors in series arrangement.

There are various implementations of the arrangement of the multiple augers in this disclosure. FIGS. 8A-8E are top view diagrams. Referring to FIG. 8A, the first, second, third and fourth augers 42, 44, 46, and 48 are driven by a hydraulic circuit. In particular, the first, second, third, and fourth augers 42, 44, 46, and 48 are rotated respectively by the first, second, third, and fourth motors 43, 45, 47, 49. The first and second augers 42, 44 rotate in one direction and the third and fourth augers 46, 48 rotate in an opposite direction. The rotational directions of the augers 42, 44, 46, 48 can be different in other implementations. The first, second, third, and fourth motors 43, 45, 47, 49 driven by the hydraulic fluid are disposed in a series arrangement of the hydraulic circuit. The first motor 43 is upstream the second motor 45. In this implementation, the augers 42, 44, 46, 48 and the corresponding motors 43, 45, 47, 49 are coupled by the clutches 50 as shown in FIGS. 7A and 7B. Therefore, each of the augers 42, 44, 46, 48 may not overpack the cotton. Even if one of the augers 42, 44, 46, 48 does not rotate because the reaction disconnects one of the clutches 50, the hydraulic fluid can still drive the motors 43, 45, 47, and 49 to ensure the three other augers can rotate properly.

Figures 1, 8B:
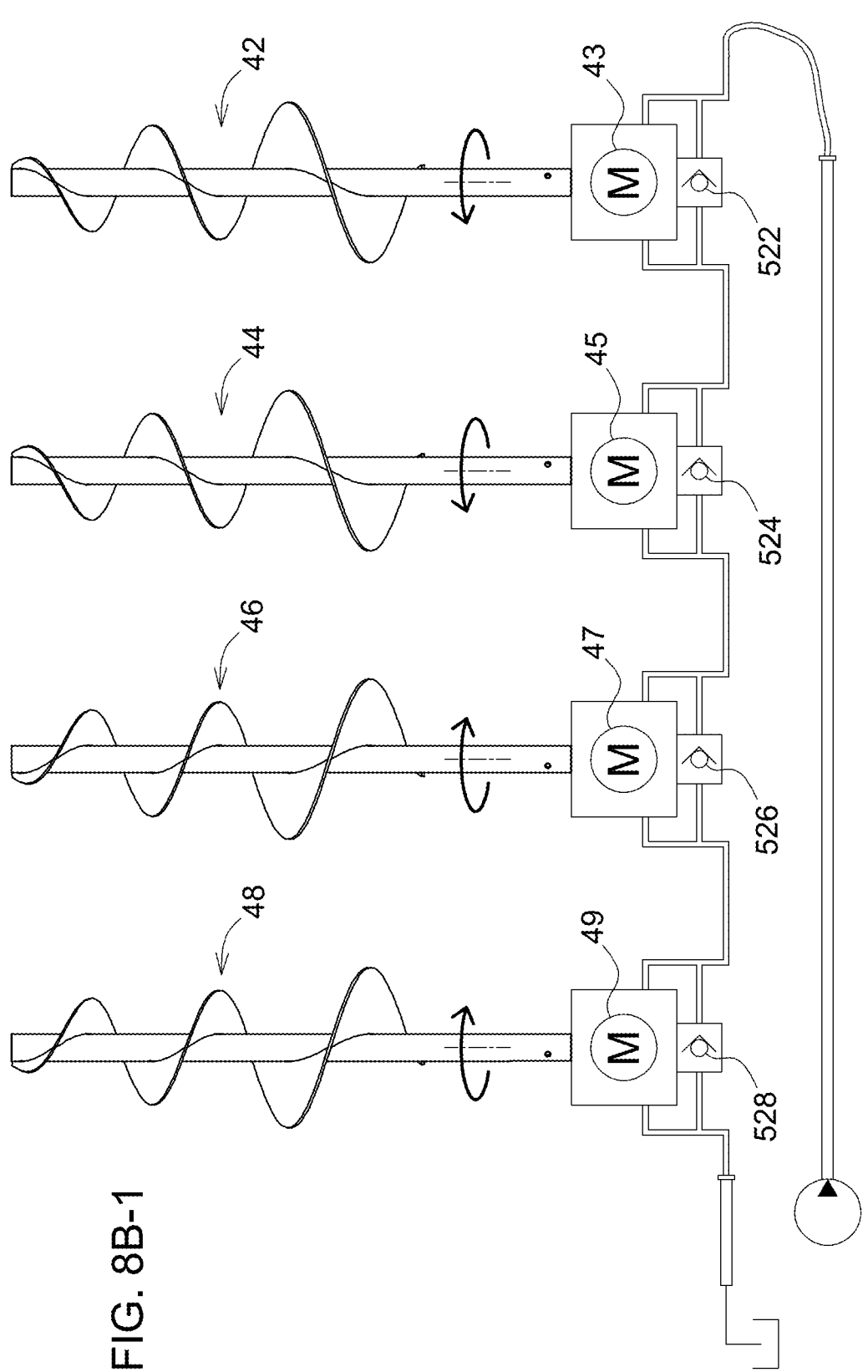
Figures 2, 8B:
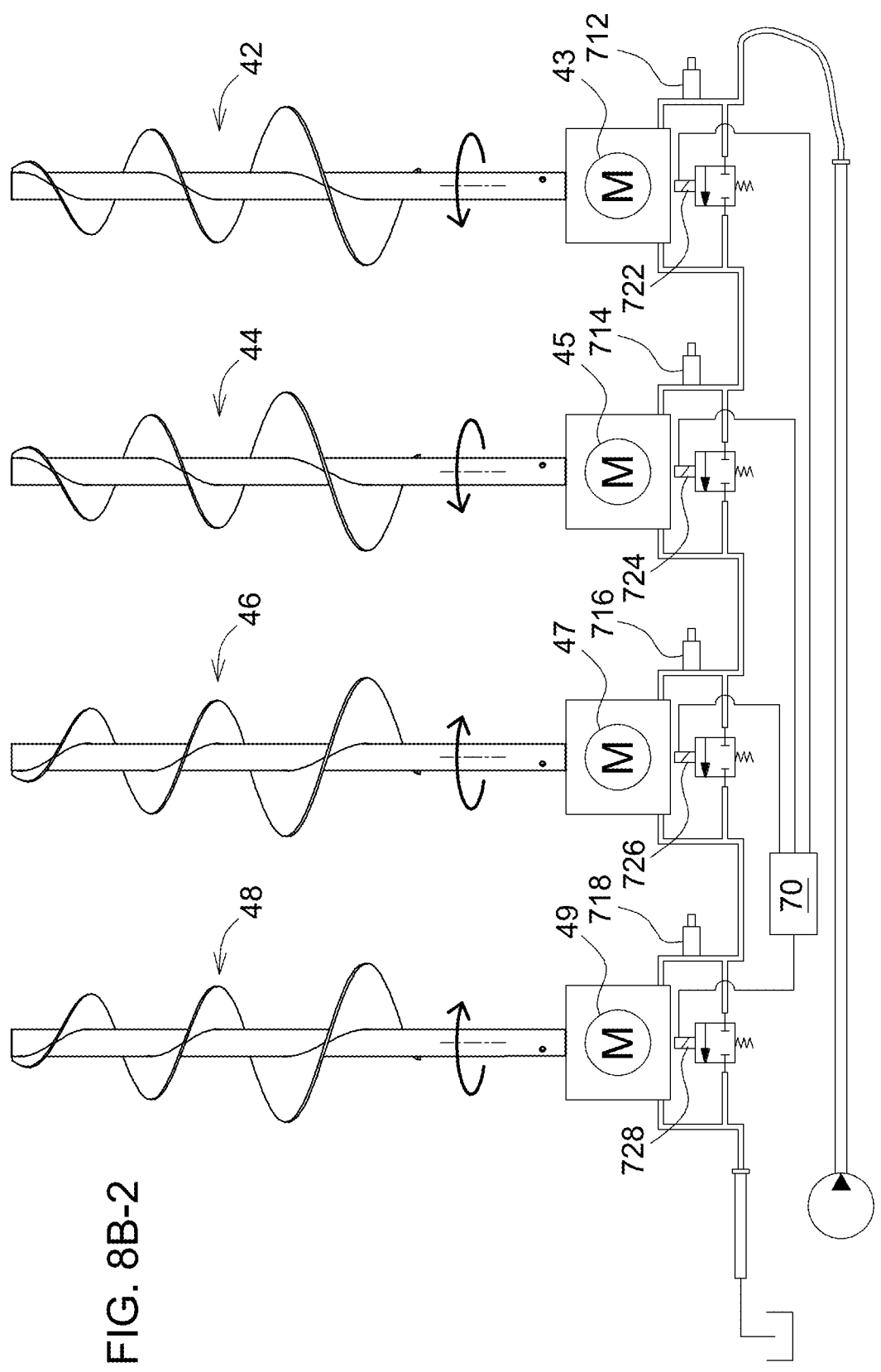

Referring to FIG. 8B, the first, second, third and fourth augers 42, 44, 46, and 48 are driven by another hydraulic circuit. In particular, the first, second, third, and fourth augers 42, 44, 46, and 48 are rotated respectively by the first, second, third, and fourth motors 43, 45, 47, 49. The first, second, third, and fourth motors 43, 45, 47, 49 driven by the hydraulic fluid are also disposed in a series arrangement of the hydraulic circuit. Different from the implementation shown in FIG. 8A, the implementation shown in FIG. 8B-1 includes the hydraulic circuit having four bypass lines. Take the first auger 42 and first motor 43 for example. The one of bypass lines has a bypass valve 522 and is configured to allow the hydraulic fluid to bypass the first motor 43 and flow to the second motor 45 when a hydraulic pressure of the hydraulic exceeds a pressure threshold of the bypass valve 522. This arrange will also prevent the first auger overpacks the cotton in the accumulator 32. Therefore, even if there is no clutch applied to the first auger 42, when the reaction from the cotton increases the hydraulic pressure in the first motor 43 to exceed the pressure threshold of the bypass valve 522, the bypass valve 522, for example, a check valve, will open to ensure the downstream motors (motors 45, 47, 49) to be driven by the hydraulic fluid. Alternatively, at least a solenoid valve and a sensor may be applied to another hydraulic circuit to replace the check valve in the previous implementation. For example, as shown in FIG. 8B-2, another hydraulic circuit includes sensors 712, 714, 716, 718 configured to detect hydraulic pressure of the first, second, third, and fourth motors 43, 45, 47, 49. A controller 70 is configured to receive a signal indicative of the hydraulic pressure and to control or power solenoid vales 722, 724, 726, 728 that regulate the hydraulic fluid to enter the first, second, third, and fourth motors 43, 45, 47, 49 when the hydraulic pressure exceed a pre-determined pressure. The controller 70 includes or is coupled to a memory (not shown) and the data of the pre-determined pressure is a part of algorithm saved in the memory.

Figure 8C:
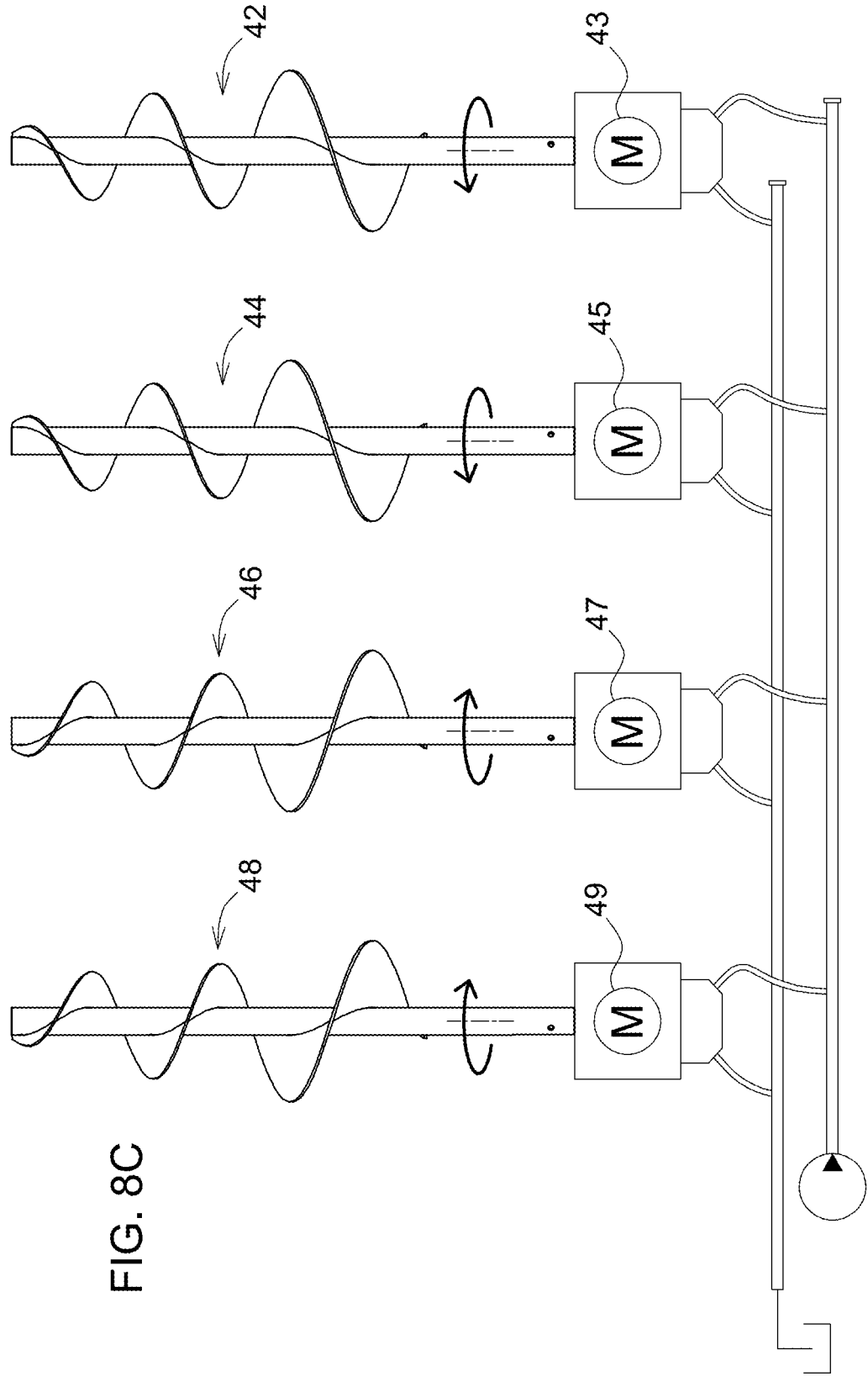
FIG. 8C is a diagram showing the motors in parallel arrangement.

Referring to FIG. 8C, the first, second, third and fourth augers 42, 44, 46, and 48 are driven by another hydraulic circuit. In particular, the first, second, third, and fourth augers 42, 44, 46, and 48 are rotated respectively by the first, second, third, and fourth motors 43, 45, 47, and 49. The first, second, third, and fourth motors 43, 45, 47, 49 driven by the hydraulic fluid are disposed in a parallel arrangement of the hydraulic circuit.

Figure 8D:
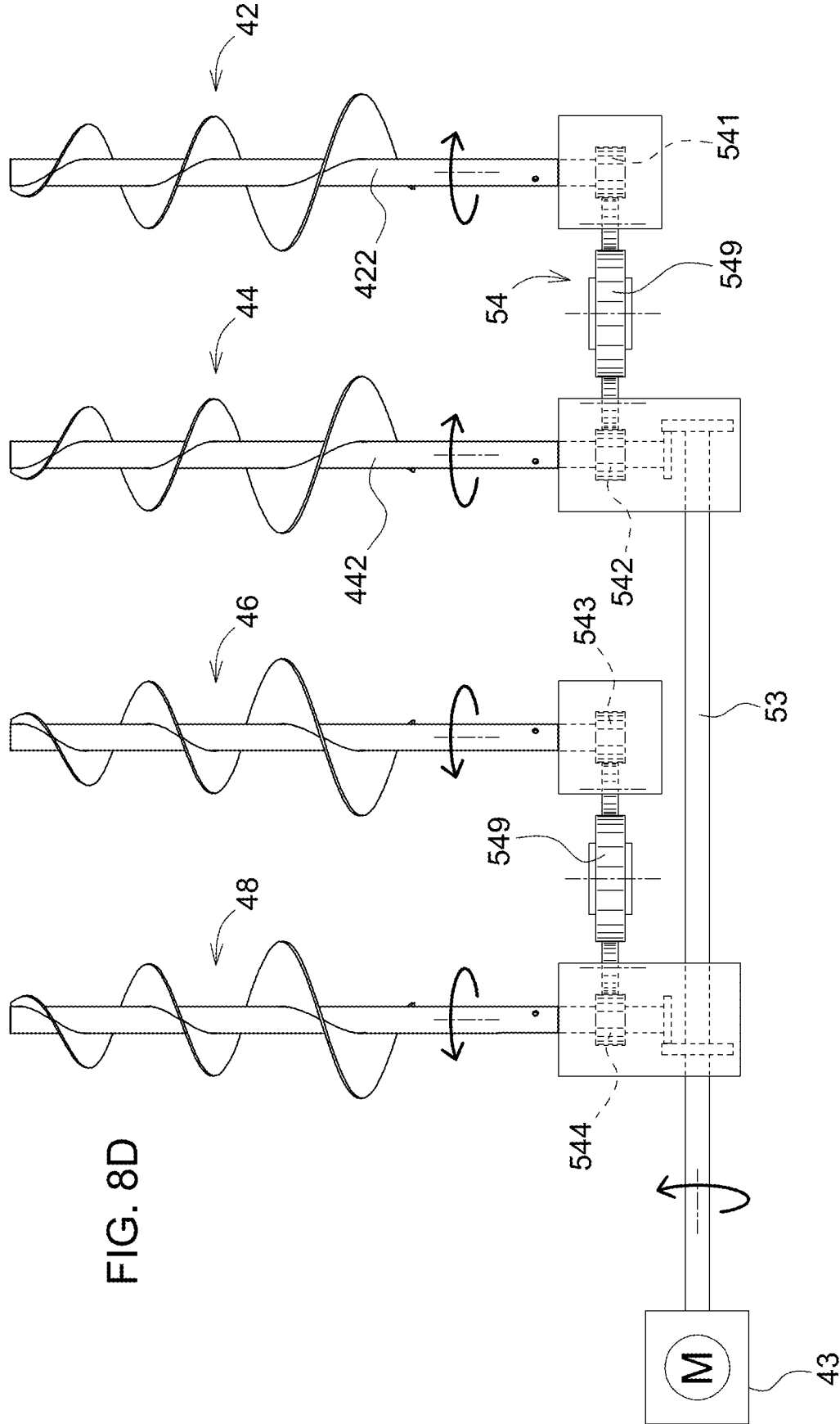
FIG. 8D is a diagram having a single motor coupled to the augers through a gear arrangement.
Figure 8E:
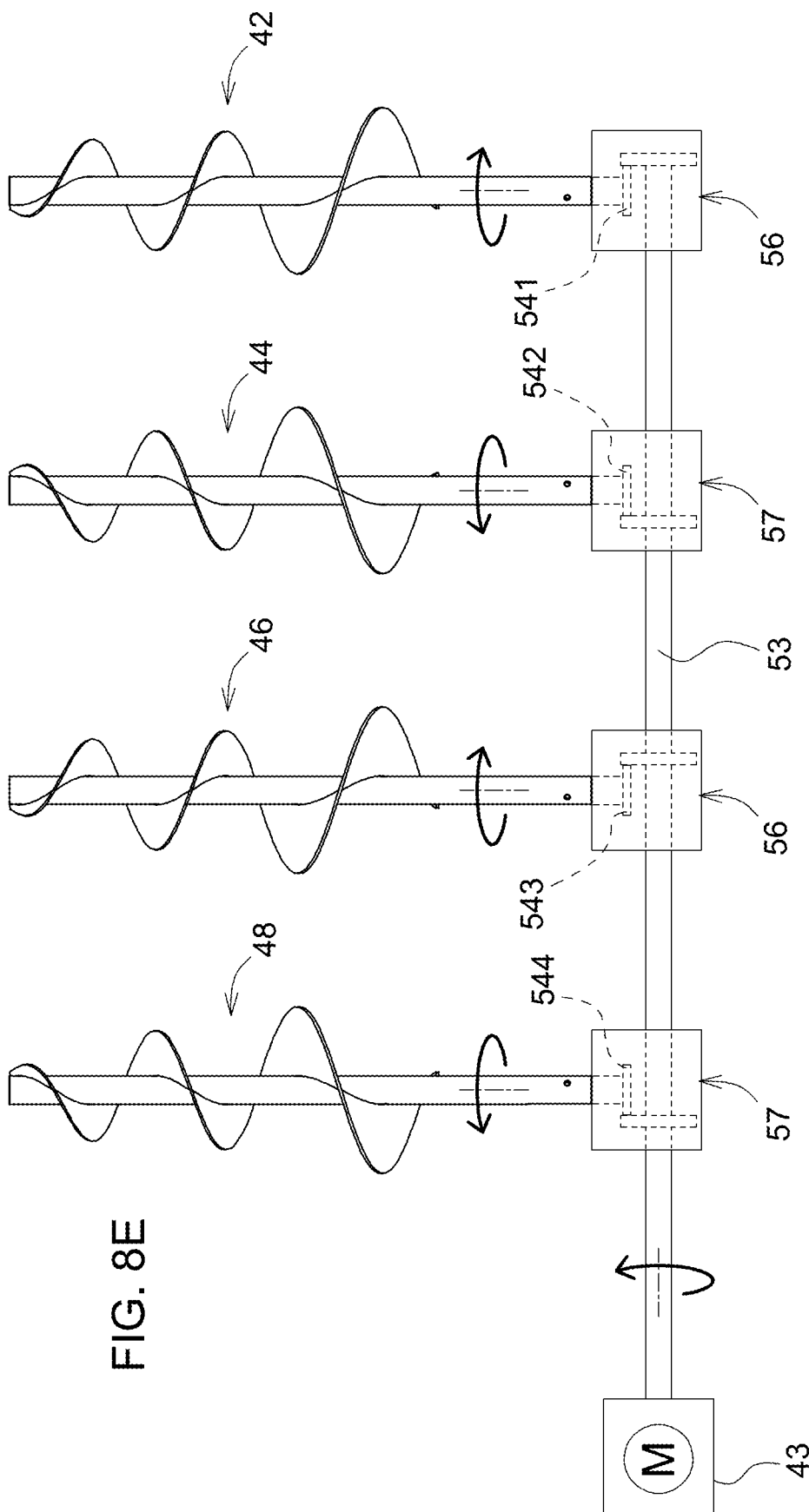
FIG. 8E is a diagram having a single motor coupled to the augers through another gear arrangement.

FIGS. 8D and 8E discloses a single motor (e.g., the first motor 43) coupled to a common shaft 53 that drives multiple augers of cotton compress assembly 40. Referring to FIG. 8D, the first, second, third and fourth augers 42, 44, 46, and 48 are rotated by the motor 43. It is noted that the motor 43 here can be a hydraulic motor or an electric motor. The first motor 43 extends a common shaft 53, transferring rotational output from the first motor 43 to the cotton compress assembly 40. The cotton compress assembly includes a gear arrangement 54 applied between the first, second, third and fourth augers 42, 44, 46, and 48, such that the first motor 43 rotates the first, second, third and fourth augers 42, 44, 46, and 48 through the gear arrangement 54 that is driven by the common shaft 53. The first, second, third and fourth augers 42, 44, 46, and 48 in this implementation include a first gear 541, a second gear 542, a third gear 543, and the fourth gear 544. Take the structure of the first and second augers 42, 44 for example. The first gear 541 is coupled to the first shaft 422 of the first auger 42. The second gear 542 is coupled to the second shaft 442 of the second auger 44. The second shaft 442, in the end, includes a gear meshing with a gear of the common shaft 53, so as to rotate the second shaft 442. The rotational output transferred from the common shaft 53 to the second gear 542, a middle gear 549, and the first gear 541. The middle gear 549 meshes between the first gear 541 and the second gear 542 such that the first gear 541 and the second gear 542 rotate in the same direction. Therefore, the first auger 42 and the second auger 44 rotate in the same direction. In another implementation, the first gear 541 and the second gear 542, with larger gear diameters, may directly mesh with each other (not shown) without the middle gear 549, such that the first auger 42 and the second auger 44 rotate in the same direction.

Referring to FIGS. 8E, the cotton compress assembly 40 includes another gear arrangement 54 including two gearsets 56 and two gearsets 57 coupled to the first motor 43 The first, second, third and fourth augers 42, 44, 46, and 48 in this implementation include a first gear 541, a second gear 542, a third gear 543, and the fourth gear 544, which are driven by the common shaft 53. The gearsets 56, driven by the first motor 43, rotate the first auger 42 and the third auger 46 in one direction, and the two gearsets 57, also driven by the first motor 43, rotate the second and fourth augers 44,48 in an opposite direction.

In another implementation, the first, second, third and fourth augers 42, 44, 46, and 48 may be rotated by electric motor(s).

Referring to FIG. 4C, the first shaft 422 is coupled to a support structure 426 having two side plates 4262 pivotably coupled to the pivot unit 41. In another implementation, as shown in FIG. 9A-9D, the support structure 426 is substantially a half-ball shape (hemisphere shape) with a flat portion coupled to the first motor 43. The support structure 426 include a hole 4266 for receiving the first shaft 422. The first shaft 422 having splines pass through the support structure 426 and is coupled to the first motor 43. The pivot unit 41 includes two pillow block bearings 412 (or stands having holes) forming a pivot axis 414 and coupled to the base plate 348. The pivot unit 41 also includes two pins 411, each of which extends from the side plates 4262 toward the respective pillow block bearings 412. As shown in FIGS. 9A and 9B, the base plate 348 has an aperture 3482 that is circular shape and allows spherical portion of the support structure 426 to partially insert from outside of the enclosure 34. A seal 2486 may be disposed between the aperture 3482 and the support structure 426 to prevent the cotton from passing through the aperture 3482. The seal 2486 attaches to the aperture 3482 and is a ring shape. The support structure 246 also includes stops 4264, 4265 that spaced apart from each other. The stops 4264, 4265 are configured to engage or contact the base plate 348 of the enclosure 34 to limit a pivotal movement of the first shaft 422.

Alternatively, the support structure 426 can be different shapes in other implementations. For example, referring to FIGS. 9E and 9F, the support structure 426 half-cylinder shape. The support structure 426 has a flat portion coupled to the first motor 43 (not shown). The support structure 426 includes two pins 411, each of which extends from opposite ends of the support structure 426 to engage with pillow block bearings or stands (not shown). The base plate 348 has an aperture 3482 that is rectangular shape and allows curved side of the support structure 426 to partially insert from outside of the enclosure 34. A seal (not shown) may be disposed between the aperture 3482 and the support structure 426 to prevent the cotton from passing through the aperture 3482. The seal attaches to the rectangular aperture and surrounds a cross-section of the support structure 426 that is also a rectangular shape. Like implementations shown in FIG. 4C and FIG. 9A-9D, the support structure 426 is pivotably coupled to the pivot unit 41 to facilitate the change of the angle between the shafts of the augers 42, 44, 46, 48 and the line L.

Figure 10A:
FIG. 10A is an enlarged perspective view of the accumulator having an actuator coupled between the enclosure and the support structure.
Figure 10B:
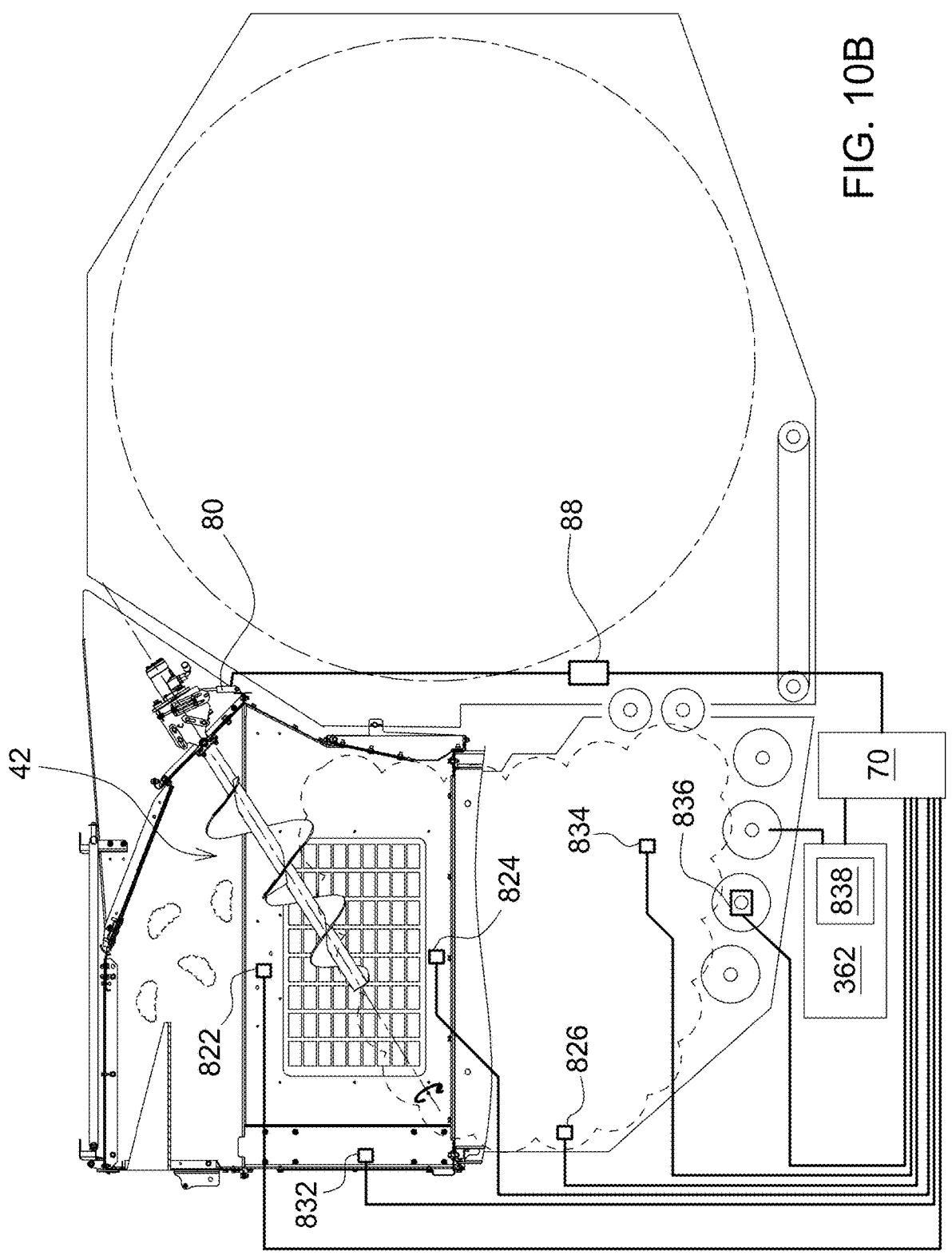
FIG. 10B is a diagram showing sensors coupled to a controller configured to control the actuator in FIG. 10B.

With reference to 4C, the resilient member 427 provides spring force to facilitate the first auger 42 to pivot upward or downward. Alternatively (or additionally), an actuator 80, as shown in FIGS. 10A and 10B, is coupled between the support structure 426 and the enclosure 34. The actuator 80 may actively retract to pivot the first auger 42 upward to decrease the downward vertical force FN and to push more cotton toward the front of the accumulator 32. The actuator 80 may actively extend to pivot the first auger 42 downward increase to downward vertical force FN to eliminate a bridge. It is noted that other augers, like the second, third, and fourth augers 44, 46, 48 may also have respective actuators (not shown) to actively extend and retract to pivot the augers 44, 46, 48. Alternatively, the augers 42, 44, 46, 48 may be connected via a linkage (not shown) and a single actuator is coupled between the linkage and the enclosure 34, such that the single actuator can move the linkage to pivot the augers 42, 44, 46, 48 together. Since the actuator 80 can pivot the augers 42, 44, 46, 48 downward, it is not required to use heavy materials for the augers 42, 44, 46, 48, the weight of which compress the cotton. With the supplemental downforce provided by actuator 80, light materials of the augers 42, 44, 46, 48 may be used.

The present disclosure also includes a method of pivoting the auger via the actuator 80. The actuator 80 may pivot the first auger 42, for example, downward, to eliminate a bridge. Multiple sensors are electrically connected to the controller 70 to determine whether there is the bridge. As shown in FIG. 10B, sensors 822, 824, 826 are positioned at different locations of the enclosure 34 to measure whether the cotton level reaches the sensors 822, 824, 826. The sensors 822, 824, 826, for example, are laser light sensors configured to detect respective laser beams emitted from the respective light sources (not shown). The numbers and locations of the sensors 822, 824, 826 herein are described for explanatory purpose and can be different numbers and locations in other implementations. Explanatory conditions are listed as follows. When the cotton is accumulated between the sensors 822, 824, 826 and light sources and the sensors 822, 824, 826 are not able to detect the respective laser beams, the condition is that the cotton level rises to or surpasses the location of the sensor 822 (a pre-determined level) without a bridge. When the cotton is accumulated between the sensors 824, 826 and light sources and the sensors 824, 826 are not able to detect the respective laser beams, the condition is that the cotton level rises to or surpasses the location of the sensor 824 (another pre-determined level) without a bridge. When all sensors 822, 824, 826 can detect laser beams, the cotton may be in very low level and no bridge is formed. However, when the cotton is accumulated between the sensors 822, 824 (or just the sensor 824) and light sources and the sensors 822, 824 (or just the sensor 824) are not able to detect the respective laser beams but the sensors 826 is able to detect a laser beam, the condition is that a bridge is formed, and a cavity underneath the bridge is created, likely during an unloading process when the accumulated cotton is transferred to the module builder, allows the laser beam to be received by the sensors 826, whose location is likely to have the cavity.

Alternatively (or additionally), the multiple sensors include at least one sensor 832, which is a camera located at a position higher than the cavity, to detect the cotton level. The controller 70 may receive signal from the sensor 826 and the sensor 832 to determine whether there is a bridge, i.e., the cotton level reaches a pre-determined level and is detected by the sensor 832 but the sensor 826 can still receive the laser beam. Alternatively (or additionally), the multiple sensors include at least one sensor 834, which is a camera located at a position likely to have the cavity. The controller 70 may receive signals from the sensor 822 and/or 824 and the sensor 836 to determine whether there is a bridge, i.e., the cotton level reaches a pre-determined level and is detected by the sensor 822 or 824 but the sensor 834 can still create an image showing no cotton is accumulated in the lower part of the accumulator 32. Alternatively (or additionally), the multiple sensors include the sensors 832, 834 for the controller 70 to determine whether there is a bridge, i.e., the cotton level reaches a pre-determined level and is detected by the sensor 832 but the sensor 834 can still create an image showing no cotton is accumulated in the lower part of the accumulator 32. Alternatively (or additionally), the signal from sensor 834 alone may be sufficient for the controller 70 to determine the bridge is formed, when an image created by the sensor 834 includes the cavity and the bottom of the bridge.

In another implementations, the sensors 822, 824, or 832 and some other sensors configured to detect the characteristic of an element of the accumulator 32 may transmit signals for the controller 70 to determine whether there is a bridge. In one implementation, the controller 70 may receive a signal from a sensor 836, which may be a load or strain sensor applied on a stud of one of the metering rollers 361 or beating rollers 37. When the controller 70 receives a signal from the sensors 822, 824, or 832 indicating that the cotton level reaches a pre-determined level and receives a signal from the sensor 836 indicating that the load or strain is greater than a threshold of the load or strain, the controller 70 may determine that no bridge is formed. However, when the controller 70 receives the signal from the sensors 822, 824, or 832 indicating that the cotton level reaches the pre-determined level and receives the signal from the sensor 836 indicating that the load or strain is less than or equal to the threshold of the load of strain, the controller 70 may determine that a bridge is formed. In another implementation, the controller 70 may receive a signal from a sensor 838, which is a hydraulic pressure sensor. The sensor 838 measures the hydraulic pressure of a roller motor 362 that is a hydraulic motor and rotates the metering roller(s) 361. When the controller 70 receives a signal from the sensors 822, 824, or 832 indicating that the cotton level reaches a pre-determined level and receives a signal from the sensor 838 indicating that the hydraulic pressure of the roller motor 362 is greater than a threshold of the hydraulic pressure, the controller 70 may determine that no bridge is formed. However, when the controller 70 receives the signal from the sensors 822, 824, or 832 indicating that the cotton level reaches the pre-determined level and receives the signal from the sensor 838 indicating that the hydraulic pressure of the roller motor 362 is less than or equal to the threshold of the hydraulic pressure, the controller 70 may determine that a bridge is formed. Similarly, a sensor (not shown) measures the hydraulic pressure of a roller motor (not shown) that rotates the beating roller(s) 37 may be used for the controller 70 to determine that whether a bridge is formed.

In another implementation, a roller motor (not shown) is an electric motor and rotates the metering roller(s) 361 or beating roller(s) 37. When the controller 70 receives a signal from the sensors 822, 824, or 832 indicating that the cotton level reaches a pre-determined level and receives a signal from the sensor (not shown) indicating that the electric current of the roller motor 362 is greater than a threshold of the electric current, the controller 70 may determine that no bridge is formed. However, when the controller receives the signal from the sensors 822, 824, or 832 indicating that the cotton level reaches the pre-determined level and receives the signal from the sensor indicating that the electric current of the roller motor is less than or equal to the threshold of the electric current, the controller 70 may determine that a bridge is formed.

It is noted that the data of the pre-determined cotton level and the data of the threshold of the hydraulic pressure (of the hydraulic motor to rotate the metering roller 361 or beating roller 37), the data of the threshold of the current (of the electric motor to rotate the metering roller 361 or beating roller 37), and the data of the threshold of the load/strain of the stud are saved in the memory included by or coupled to the controller as part of algorithm for the controller 70 to determine whether there is a bridge formed in the accumulator 32. Once the controller 70 determines that the bridge is formed, the controller 70 will control the actuator 80 so as to pivot the first auger 42 down. The controller 70 may also pivot the first auger 42 up when there is no bridge, and the cotton level keeps rising. The memory coupled to the controller 70 may include a lookup table describing an appropriate angle between the first shaft 422 of the auger 42 and the line L (or an angle between the auger and enclosure, for example) in response to the cotton level. If the actuator 80 is a hydraulic actuator, the controller 70 may control the direction and/or volume of the hydraulic fluid entering the actuator 80 via a control valve 88. If the actuator 80 is an electric actuator (cylinder), the controller may directly control the actuator 80 via electric signals. There are other implementations for the controller 70 to control the operation of the actuator 80.

Figure 11A:
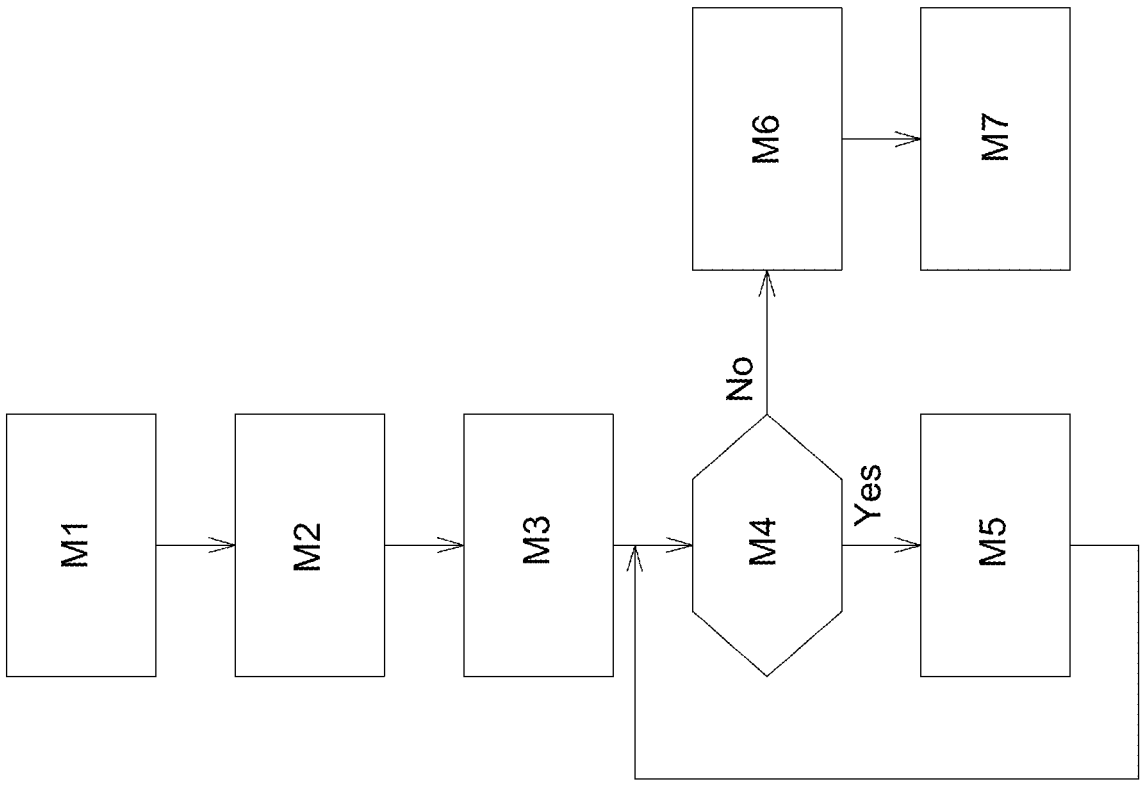
FIG. 11A is a flow chart showing a method for pivoting an auger.

A method for pivoting the auger via the actuator in the present disclosure includes M1-M7, as shown in FIG. 11A.

M1: receiving the cotton from an inlet of the accumulator.

M2: detecting the cotton level in the accumulator. The detection of the cotton level may be accomplished via at least a pair of (laser) light source and sensor (e.g., sensors 822, 824). Alternatively or additionally, the detection of the cotton level may be accomplished via a camera (e.g., sensor 832).

M3: detecting the characteristic of an element of the accumulator and/or detecting whether there is cotton accumulated in the lower part of the enclosure (tapered storage space) by another pair of (laser) light source and sensor (e.g., sensor 826) and/or by another camera (e.g., sensor 834) positioned at the lower part of the enclosure. The element herein can be a hydraulic roller motor configured to rotate the metering roller or beating roller, an electric roller motor configured to rotate the metering roller or beating roller, a stud of the metering roller or beating roller, etc. When the element is the hydraulic roller motor, the characteristic is the hydraulic pressure of the hydraulic roller motor detected by a hydraulic pressure sensor. When the element is the electric roller motor, the characteristic is the electric current of the electric roller motor detected by an electric current sensor. When the element is the stud of the metering roller or beating roller, the characteristic is the load or strain of the roller detected by a load or strain sensor. The camera (e.g., sensor 834) installed at the lower part of the enclosure creates an image showing how the cotton is accumulated in the lower part of the accumulator.

M4: determining whether there is a bridge. Yes, go to M5; No, go to M6.

The controller may determine whether there is a bridge based on at least one of the detections in M2 and/or M3. The controller may also determine the characteristic of the element of the accumulator based on signals provided by the sensor in M2 and/or M3. When there is a very low cotton level or no cotton (detected in M2), the controller may determine that no bridge is formed.

When the cotton level is at a pre-determined level (e.g., reaches or is higher than the location of sensor like the sensor 822 or sensor 824) but (i) the hydraulic pressure of the hydraulic roller motor is below a threshold of the hydraulic pressure; (ii) the current of the electric roller motor is below a threshold of the electric current; (iii) the load or strain of (the stud of) the roller is below a threshold of load or strain; or (iv) there is no cotton accumulated in the lower part of the enclosure (there is a hollowed space at the tapered storage space) detected by the camera (e.g., sensor 834), the controller may determine a bridge is formed. It is noted that the controller may merely use an image created by the camera (e.g., sensor 834) to determine that a bridge is formed if the image shows the cavity and the bottom of the bridge.

On the contrary, when the cotton level is at a pre-determined level (e.g., reaches the location of sensor) but (i) the hydraulic pressure of the hydraulic roller motor is above the threshold of the hydraulic pressure; (ii) the current of the electric roller motor is above the threshold of the electric current; (iii) the load or strain of (the stud of) the roller is above the threshold of load or strain; or (iv) there is cotton accumulated in the lower part of the enclosure (there is no hollowed space at the tapered storage space) detected by the camera (e.g., sensor 834), the controller may determine that no bridge is formed.

M5: pivoting the auger downward to eliminate the bridge, then go to M4. The actuator extends or retracts to pivot the auger downward. Optionally, not only the auger is pivoted downward, the speed of motor of the auger increases, controlled by the controller.

M6: pivoting the auger upward. The auger is pivoted upward by the reaction from the cotton during the rise of the cotton level. Optionally the actuator retracts or extends to pivot the auger upward in response to the rise of the cotton level, so as to move some cotton forward in an appropriate amount.

M7: unloading the cotton in the accumulator to the module builder.

The present disclosure also includes a cotton handling system for a cotton harvester, which is discussed previously. The system may comprise the accumulator, the auger, the actuator, and the controller as discussed. The accumulator has the enclosure configured to receive cotton from an inlet. The auger is positioned within the enclosure and is configured to compress the cotton when the first auger rotates around an axis. The actuator is coupled to the auger and is configured to pivot the auger. The actuator, as discussed, may extend or retract to pivot the auger. The controller is configured to receive a signal from the sensor (for example, the sensors described in M3 of the method) associated with the accumulator, to determine, based on the received signal, whether a bridge of cotton is formed within the accumulator, and to command, in response to determining the bridge, the actuator to pivot the auger. The controller is configured to determine a characteristic of an element of the accumulator based on the received signal from the sensor.

Figure 11B:
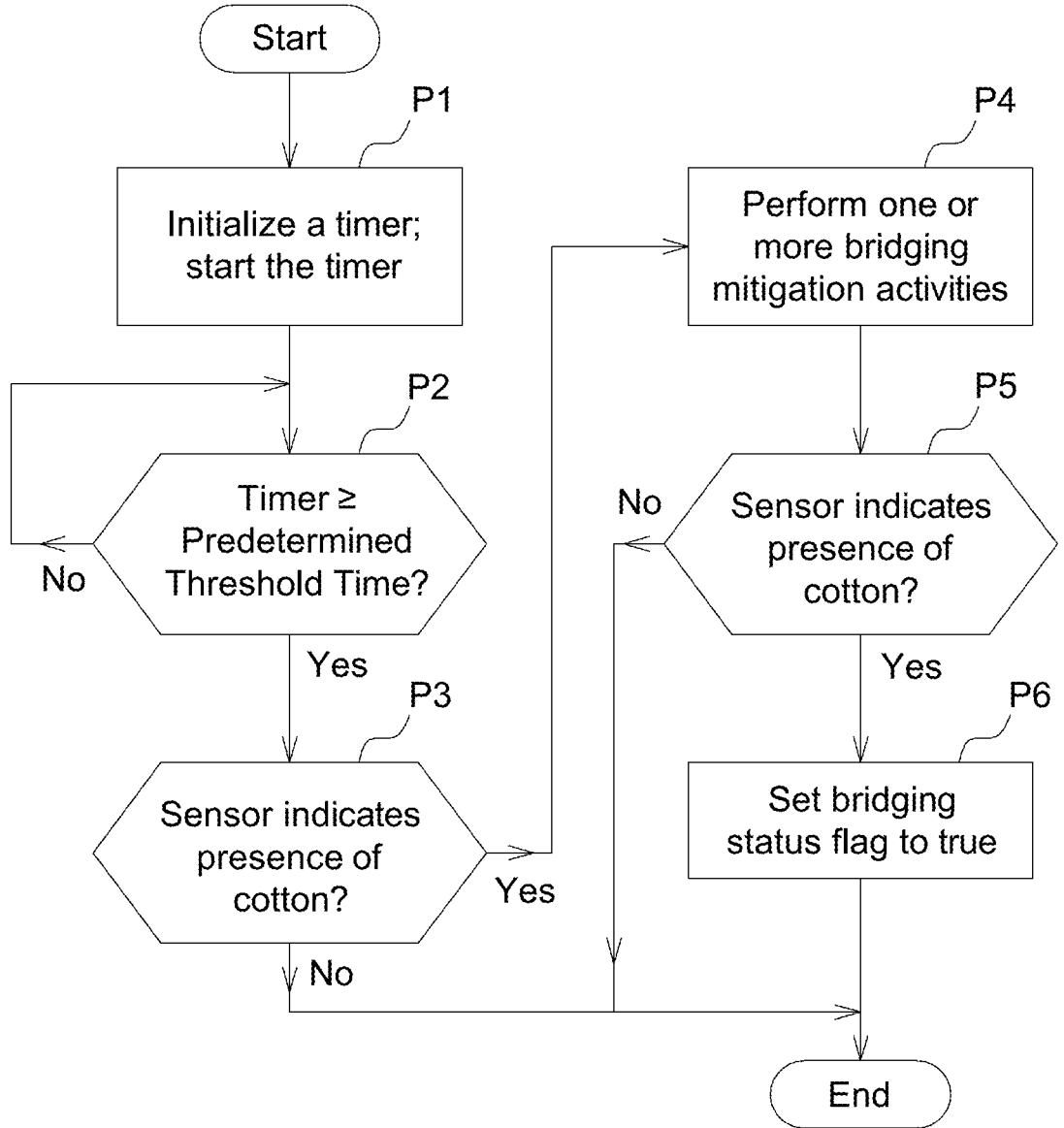
FIG. 11B is another flow chart showing a method for controlling an auger.

Another method for controlling the auger via the actuator, as shown in FIG. 11B, may include time as a factor, to detect the bridge and/or the cavity, and to remove or mitigate the bridge during an unloading cycle. FIG. 11B relates to a bridge detection and removal cycle. As such, when the accumulator 32 keeps receiving cotton later, the new cotton will not be stacked on the bridge.

Start: The controller 70 may receive an indication, e.g., a signal, that an unloading has started—for example, when the cotton level in the accumulator 32 reaches a certain level.

At P1, a timer is initialized. The timer is coupled to or included by the controller 70. Unloading will trigger or start the timer, and the timer will start to count the time of the unloading.

At P2, the controller determines if a predetermined period of time has elapsed since the unloading process started. For example, the controller compares the value of the timer to a predetermined threshold value. The predetermined threshold value may be stored—for example, in the memory. The predetermined threshold value may represent an average time needed to unload the cotton originally accumulated at a certain level in the accumulator 32. Alternatively, the predetermined threshold value may represent an average time needed to unload the cotton originally accumulated at a certain level in the accumulator 32 plus additional time, to make sure that if there is no bridge formed in the accumulator, most of the cotton are unloaded. If the value of the timer count is greater than or equal to the predetermined threshold time (Yes), go to P3. If not, the timer continues counting the time.

At P3, the controller determines whether cotton is present at a certain level in the accumulator based on one or more signals received from the sensor(s)—for example, sensors 822, 824, 826, 832, 834, 836, 838, solely or cooperatively. In an unloading cycle, signal(s) from one or more sensors may indicate the presence of the cotton. If the sensor(s) indicates the presence of the cotton at the certain level (Yes), go to P4. In other words, after a predetermined threshold time for unloading, the presence of cotton is still being detected at the certain level. Therefore, it is likely that a bridge is present. Active performance, such as pivoting the auger, may be done to mitigate the bridge, as described below. If the sensor(s) does not indicate the presence of the cotton, it is likely that a bridge is not present in the accumulator 32. Therefore, go to the end of the bridge detection and removal process.

P4: Perform one or more bridging mitigation activities. Several activities related to the auger(s) may be performed to mitigate the bridge, including: (1) commanding the actuator(s) to pivot the auger(s) downward to mitigate or eliminate the bridge (2) when the flighting of the auger contacts the bridge (or can contact with the auger pivoted), rotating the auger in one direction about an axis (e.g., first axis 421) to push a portion of cotton downward/forward or backward and/or rotate in the opposite direction about the axis to pull a portion of cotton upward/backward or forward, so as to remove the bridge; (3) commanding the actuator(s) to pivot the auger(s) upward to mitigate or eliminate the bridge; and (4) a combination of any activities (1), (2), and/or (3). Upon completion of the one or more bridging mitigation activities, go to P5.

At P5, the controller determines whether cotton is still present at the certain level in the accumulator based on the signals received from the sensor(s). If yes, go to P6. This means that after the bridging mitigation activities, the bridge may still exist. In such instances, additional actions may be necessary. If no, go to end. This means that the one or more activities successfully mitigated the bridge.

At P6, a bridging status flag is set to true. An alert based on the value of the bridging status flag may be presented to the operator—for example, via a display, speaker, or other output device located in the cab 18.

End: end of the bridge detection and removal cycle.

Figure 12A:
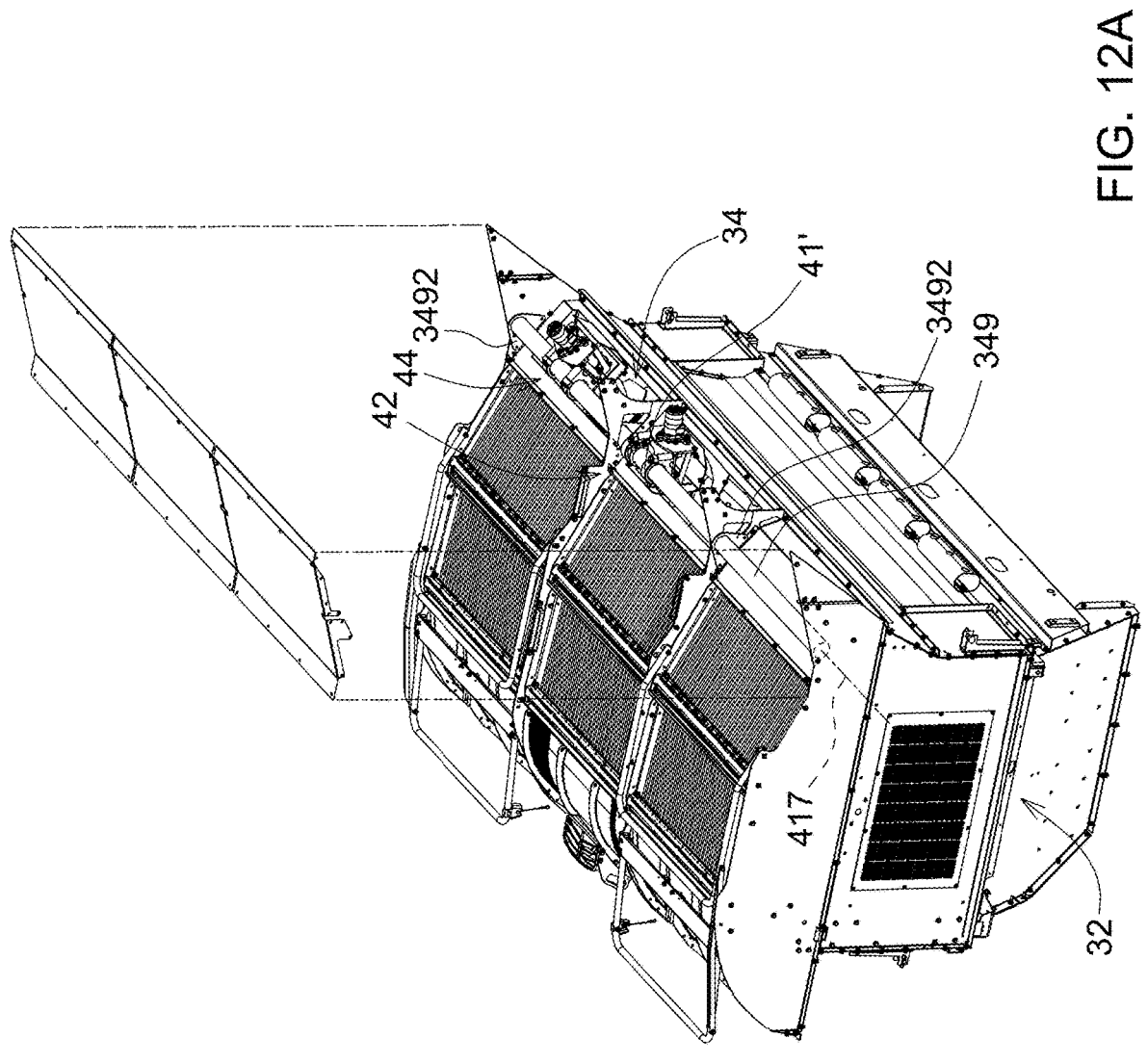
FIG. 12A is a perspective view of the accumulator having augers pivotably coupled to a tube in another implementation.
Figure 12B:
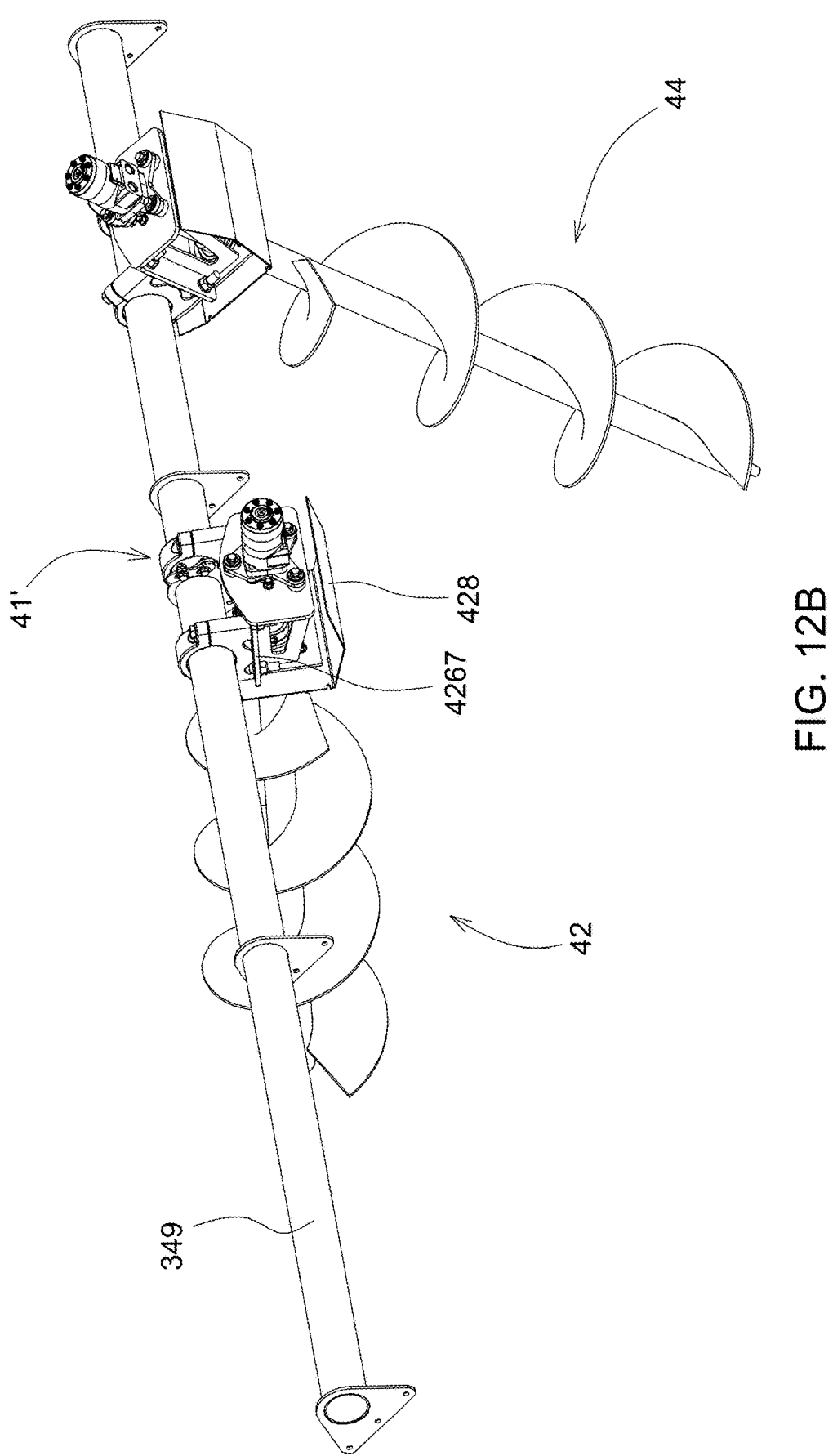
FIG. 12B is a perspective view of two augers pivoted in different positions in FIG. 12A.
Figure 12C:
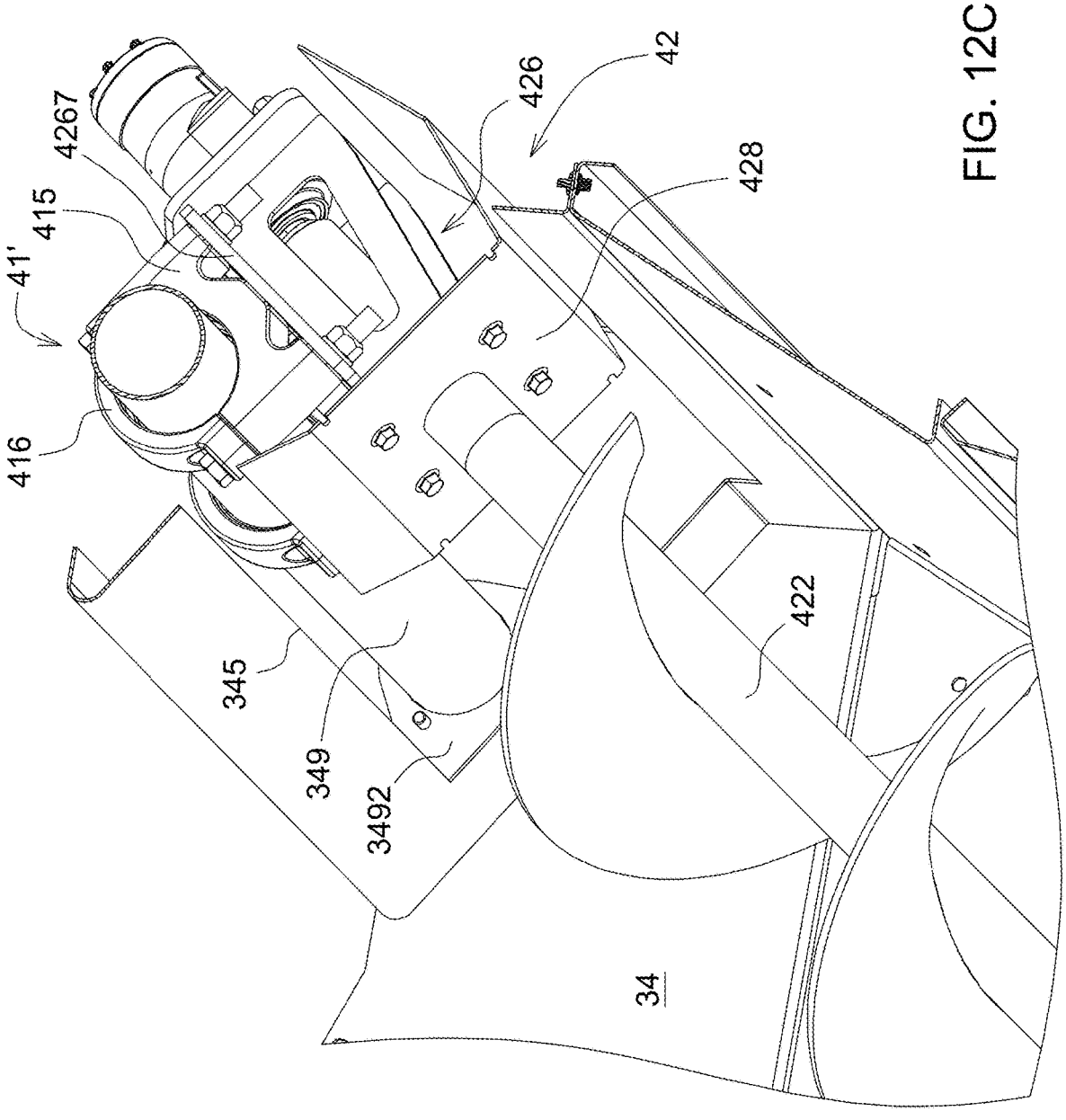
FIG. 12C is an enlarged perspective view of a support structure, two pivot units, and a shield plate in FIG. 12A.

In another implementation, the first auger 42 may pivot or swing around an axis different from the pivot axis 414 shown in FIG. 4C. Referring to FIGS. 12A-12E, another implementation of the pivot unit 41 and the support structure 426 is shown. The accumulator 32 may also include a tube 349 coupled to the enclosure 34. The orientation of the tube 349 may be perpendicular to the travel of the cotton harvester 20. There are multiple stands 3492 connected between the tube 349 and enclosure 34. The support structure 426 may include a front plate 4267. As shown in FIGS. 12B, 12C, two pivot units 41' are coupled to the front plate 4267. Each of the two pivot units 41' may include a first piece 415 and a second piece 416 cooperatively surrounding the tube 349. In the implementation shown in FIGS. 12A-12E, the first piece 415 and the second piece 416 are steel castings having curved surfaces facing each other and connected through nuts and bolts. Another side of the first piece 415 is coupled to the front plate 4267. In some implementations, the first piece 415 and/or the second piece 416 may have plastic ware liners (not shown) positioned between on their curved inner surfaces. The plastic ware liners may be attached to the curved inner surface(s) of the first piece 415 and/or the second piece 416. As such, the plastic ware liners provide low friction to allow a smooth rotation between the pivot unit 41' and the tube 349. In another implementation, a bearing (not shown) may be installed between the pivot unit 41' and the tube 349 to provide a smooth rotation therebetween.

The connection between the pivot units 41' the front plate 4267 of the support structure 426 is only an example. The support structure 426, in another implementation (not shown), may include another element, such as a rear plate, a side plate, a pillar, or a block, connected to the pivot units 41'. The number of the pivot unit(s) 41' may vary. In another implementation, the support structure 426 is connected to a single pivot unit 41' or more than two pivot units 41' (not shown). The first piece 415 and the second piece 416 may be combined by other fasteners—such as screws or latches—to surround the tube 349. In another implementation, one end the first piece 415 and one end the second piece 415 may be coupled together as a single piece with the other end of the first piece 415 and the other end of the second piece 416 adjustably fastened (like a saddle clamp). Alternatively, the pivot units 41' may include another type of single piece without any clamping structure, and the operator or manufacturer may insert the tube 349 through a hole of the pivot unit 41' before the tube 349 mounted on the enclosure 34.

The tube 349 may be coupled to the enclosure 34 through the stand 3492 inside or outside of the enclosure 34. Referring to FIG. 12A, the tube 349 is positioned outside of the enclosure 34. The two pivot units 41' rotate or pivot relative to the tube 349 around a pivot axis 417. As such, the first auger 42 may swing from a first position (shown in FIG. 12D) to a second position (shown in FIG. 12E), with the accumulation of the cotton and/or an actuation of an actuator (not shown, like the actuator 80 in FIG. The method for pivoting the auger(s) via the actuator, as shown in FIGS. 11A, 11B, may also applied to the first auger 42 coupled to the pivot units 41' in the implementation of shown in FIGS. 12A-12E.

Figure 12D:
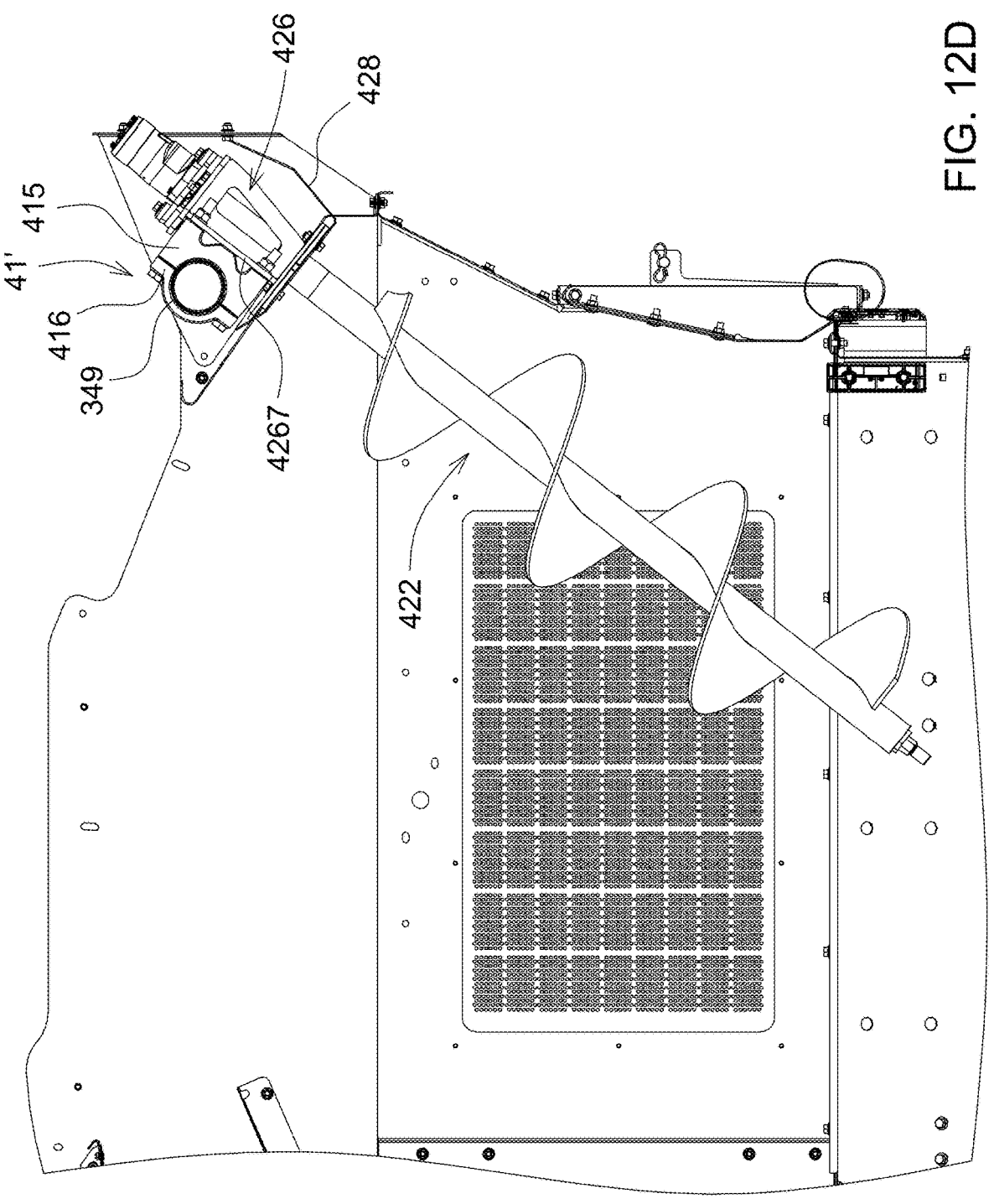
FIG. 12D is a side view of the auger that is located at a first position in the enclosure of the accumulator.
Figure 12E:
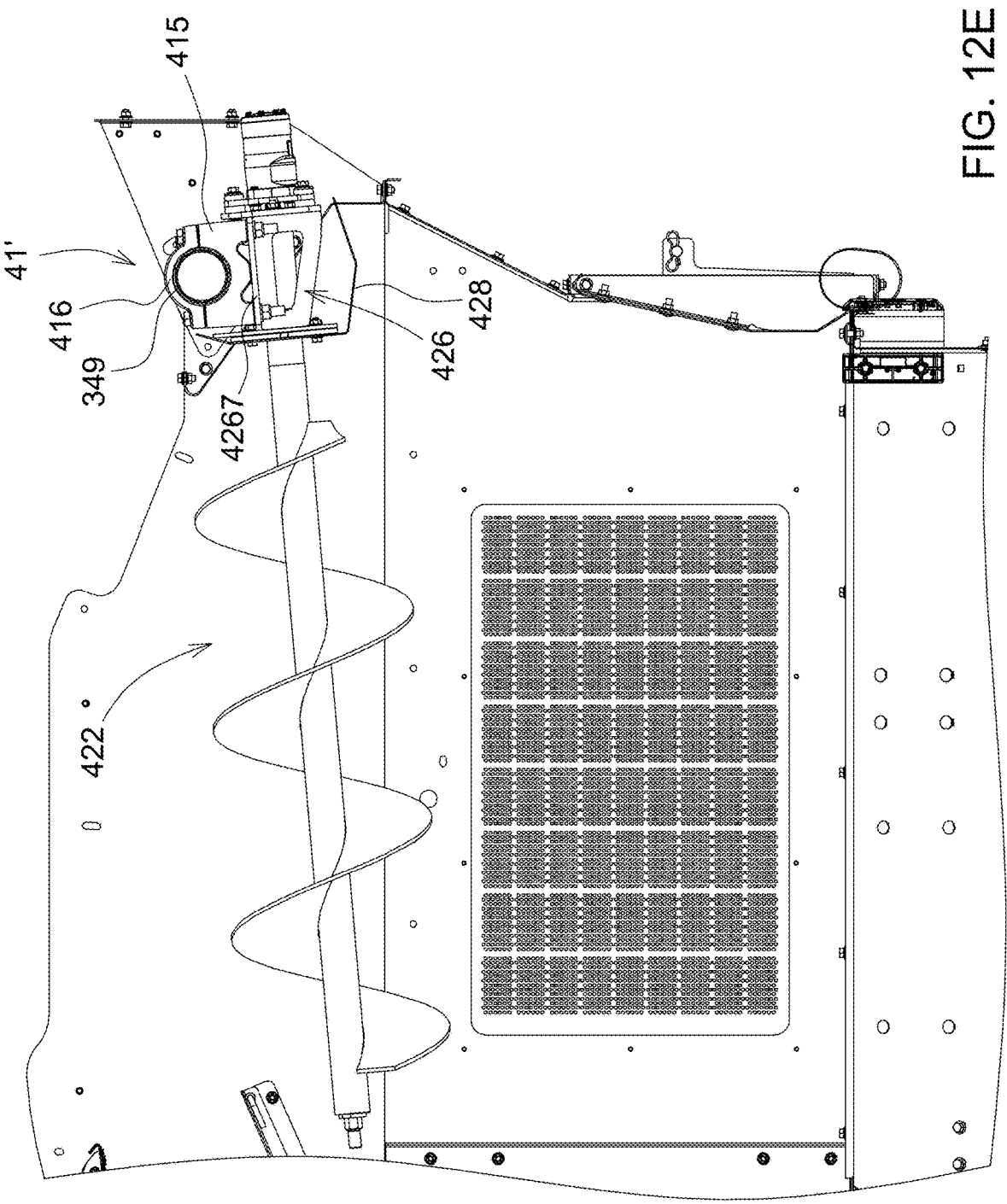
FIG. 12E is a side view of the auger that is located at a second position in the enclosure of the accumulator.

Referring to FIG. 12C, the enclosure 34 includes an opening 345, which allows the pivot units 41' and the support structure 426 of the first auger 42 to swing/pivot around the tube 349 without interference. The first auger 42 may include at least one shield plate 428 positioned under the support structure 426 near the opening 345 of the enclosure 34. As shown in FIGS. 12D, 12E, the shield plate 428 may be bent into segments and is configured to restrict the cotton escaping from the enclosure 34 through the opening 345.

The first auger 41 may be moveable along the direction of the extension of the tube 349. Two stops (now shown), such as clamps, may be selectively attach on the tube 349 to limit the first auger 41 moving along the tube 349. Therefore, the location of the first auger 41 on the tube 349 can be adjusted. The number of the augers using the pivot units 41' may be multiple. FIG. 12B merely illustrates the first auger 42 and the second auger 44. The locations of the first auger 42 and the second auger 44 can be adjusted via the stops abut thereon. Multiple augers pivotably hanging on the tube 349 may be spaced in different distances between every two adjacent augers. The augers can be distributed at the optimal locations on the tube 349 to compress the cotton.

In another implementation, the tube 349 may be replaced by multiple tubes (not shown), and at least one of the multiple augers is pivotably coupled to respective tube. In another implementation, the support structure(s) of the auger(s) may be directly coupled to the tube 349 without a pivot unit. Instead, the pivot unit (not shown), such as a bearing, may be positioned between the tube 349 and the stand 3492 and may allow the tube 349 to rotate if the reaction from the accumulated cotton and/or an actuator pivots the auger.

Without in any way limiting the scope, interpretation, or application of the claims appearing below, a technical effect of one or more of the example implementations disclosed herein is to provide at least one auger of the cotton compress assembly to increase the density of the cotton in an accumulator, so as to improve the capacity of the accumulator. Another technical effect of one or more of the example implementations disclosed herein is to provide a pivot unit(s) to the auger(s) to allow it to pivot upward when the level of the cotton rises in the accumulator, so as to decrease the compact force from the auger to the cotton. Another technical effect of one or more of the example implementations disclosed herein is to utilize a clutch to discontinue the rotational output from the motor to the auger when the reaction from the cotton exceeds a threshold, such that the auger will not cause the cotton to be over-packed in the accumulator. Alternatively, another technical effect of one or more of the example implementations disclosed herein is to utilize hydraulic circuit to control the hydraulic motor(s) to rotate the auger(s), with bypass valve(s) such as check valve(s) or solenoid valve(s) and hydraulic pressure sensor(s) to prevent clogging of cotton. Another technical effect of one or more of the example implementations disclosed herein is to provide an actuator coupled between the enclosure of the accumulator and the support structure so as to actively pivot the auger to eliminate a potential bridge of cotton and to distribute or compress the cotton appropriately.

While the above describes example implementations of the present disclosure, these descriptions should not be viewed in a limiting sense. Rather, other variations and modifications may be made without departing from the scope and spirit of the present disclosure as defined in the appended claims.

In this application, including the definitions below, the term "controller" may be replaced with the term "circuit." The term "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The controller may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The controller may communicate with other controllers using the interface circuit(s). Although the controller may be depicted in the present disclosure as logically communicating directly with other controllers, in various implementations the controller may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the controller may be distributed among multiple controllers that are connected via the communications system. For example, multiple controllers may implement the same functionality distributed by a load balancing system. In a further example, the functionality of the controller may be split between a server (also known as remote, or cloud) controller and a client (or, user) controller.

Some or all hardware features of a controller may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a controller may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple controllers. The term group processor circuit encompasses a processor circuit that, in combination with additional processor circuits, executes some or all code from one or more controllers. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple controllers. The term group memory circuit encompasses a memory circuit that, in combination with additional memories, stores some or all code from one or more controllers.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An accumulator for a cotton harvester, comprising:
an enclosure defining a storage space to store cotton and including an aperture;
an inlet configured to receive cotton to the storage space;
an outlet positioned at a bottom of the enclosure and configured to release the cotton that has been accumulated in the enclosure;
at least one roller positioned adjacent to the outlet and configured to convey the cotton;
a cotton compress assembly including a first auger coupled to the enclosure, extending from a rear of the enclosure toward a front of the enclosure, the first auger (i) having a first shaft and a flighting attached to the first shaft, (ii) positioned within the enclosure, and (iii) configured to rotate around a first axis;
a first motor coupled to the first shaft and providing rotational output to rotate the first auger around the first axis;
a pivot unit coupling the first auger to the enclosure, such that the first auger is configured to move relative to the enclosure; and
a support structure (i) coupled to the pivot unit and the first shaft, (ii) configured to carry a weight of the first shaft and the flighting, (iii) partially inserted into the aperture, and (iv) pivotable relative to the aperture.

2. The accumulator of claim 1, further comprising a seal attached to the aperture and surrounding a cross-section of the support structure.

3. The accumulator of claim 1, further comprising a resilient member, wherein one end of the resilient member engages with the support structure, and the other end of the resilient member engages with the enclosure.

4. The accumulator of claim 1, further comprising:
a first motor coupled to the first shaft and providing rotational output to rotate the first auger around the first axis; and
a second auger coupled to the enclosure, the second auger (i) having a second shaft and a second flighting attached to the second shaft, (ii) positioned within the enclosure, and (iii) configured to rotate around a second axis.

5. The accumulator of claim 4, further comprising a gear arrangement applied between the first auger and the second auger, such that the first motor rotates the second auger through the gear arrangement.

6. The accumulator of claim 4, further comprising a second motor coupled to the second shaft and providing rotational output to rotate the second auger around the second axis.

7. The accumulator of claim 1, further comprising:
a first motor coupled to the first shaft and providing rotational output to rotate the first auger around the first axis; and
a clutch coupled between the first shaft and the first motor, wherein when at least a portion of reaction from the cotton applied to the first auger axially along the first shaft exceeds a pre-determined force, the clutch is moved to disconnect the first shaft and the first motor.

8. An accumulator for a cotton harvester, comprising:

an enclosure defining a storage space to store cotton;

an inlet configured to receive cotton to the storage space;

an outlet positioned at a bottom of the enclosure and configured to release the cotton that has been accumulated in the enclosure;

at least one roller positioned adjacent to the outlet and configured to convey the cotton;

a cotton compress assembly including a first auger coupled to the enclosure, extending from a rear of the enclosure toward a front of the enclosure, the first auger (i) having a first shaft and a flighting attached to the first shaft, (ii) positioned within the enclosure, and (iii) configured to rotate around a first axis;

a first motor coupled to the first shaft and providing rotational output to rotate the first auger around the first axis;

a pivot unit coupling the first auger to the enclosure, such that the first auger is configured to move relative to the enclosure;

a support structure (i) coupled to the pivot unit and the first shaft and (ii) configured to carry a weight of the first shaft and the flighting; and an actuator, wherein one end of the actuator engages with the support structure, and the other end of the actuator engages with the enclosure so as to pivot the first auger up and down relative to the enclosure.

9. The accumulator of claim 8, further comprising a tube coupled to the enclosure, wherein the pivot unit (i) is connected to the support structure, (ii) at least partially surrounds the tube, and (iii) is pivotable around to the tube to swing the first auger.

10. The accumulator of claim 9, wherein the tube is positioned outside of the enclosure, and the enclosure includes an opening allowing the first auger to swing around the tube without interference.

11. The accumulator of claim 10, further comprising a shield plate positioned under the support structure and configured to restrict the cotton escaping from the opening.

12. The accumulator of claim 8, further comprising:

a second auger coupled to the enclosure, the second auger (i) having a second shaft and a second flighting attached to the second shaft, (ii) positioned within the enclosure, and (iii) configured to rotate around a second axis.

13. The accumulator of claim 12, further comprising a gear arrangement applied between the first auger and the second auger, such that the first motor rotates the second auger through the gear arrangement.

14. The accumulator of claim 12, further comprising a second motor coupled to the second shaft and providing rotational output to rotate the second auger around the second axis.

15. The accumulator of claim 8, further comprising a seal attached to an aperture and surrounding a cross-section of the support structure.

16. An accumulator for a cotton harvester, comprising:

an enclosure defining a storage space to store cotton;

an inlet configured to receive cotton to the storage space;

an outlet positioned at a bottom of the enclosure and configured to release the cotton that has been accumulated in the enclosure;

at least one roller positioned adjacent to the outlet and configured to convey the cotton;

a cotton compress assembly including a first auger coupled to the enclosure, extending from a rear of the enclosure toward a front of the enclosure, the first auger (i) having a first shaft and a flighting attached to the first shaft, (ii) positioned within the enclosure, and (iii) configured to rotate around a first axis;

a first motor coupled to the first shaft and providing rotational output to rotate the first auger around the first axis;

a pivot unit coupling the first auger to the enclosure, such that the first auger is configured to move relative to the enclosure; and a support structure (i) coupled to the pivot unit and the first shaft and (ii) configured to carry a weight of the first shaft and the flighting;

wherein the support structure includes a stop configured to engage the enclosure to limit a pivotal movement of the first shaft.

17. The accumulator of claim 16, further comprising a resilient member, wherein one end of the resilient member engages with the support structure, and the other end of the resilient member engages with the enclosure.

18. A cotton harvester, comprising:

a harvesting structure configured to remove cotton from a field;

an accumulator including:

an inlet configured to receive the cotton;

an enclosure defining a storage space to store the cotton;

an outlet positioned at a bottom of the enclosure and configured to release the cotton that has been accumulated in the enclosure; and a cotton compress assembly including a first auger coupled to the enclosure, extending from a rear of the enclosure toward a front of the enclosure, the first auger (i) having a first shaft and a flighting attached to the first shaft, (ii) positioned within the enclosure, and (iii) configured to rotate around a first axis;

a first motor coupled to the first shaft and providing rotational output to rotate the first auger around the first axis;

a pivot unit coupling the first auger to the enclosure, such that the first auger is configured to move relative to the enclosure;

a support structure (i) coupled to the pivot unit and the first shaft and (ii) configured to carry a weight of the first shaft and the flighting;

a tube coupled to the enclosure, wherein the pivot unit (i) is connected to the support structure, (ii) at least partially surrounds the tube, and (iii) is pivotable around to the tube to swing the first auger;

a duct system through which the cotton moves from the harvesting structure to the accumulator; and a module builder coupled to the accumulator and configured to receive the cotton from the accumulator.

19. The cotton harvester of claim 18, wherein the tube is positioned outside of the enclosure, and the enclosure includes an opening allowing the first auger to swing around the tube without interference.

20. The cotton harvester of claim 19, further comprising a shield plate positioned under the support structure and configured to restrict the cotton escaping from the opening.

\* \* \* \* \*